US008577166B1

(12) United States Patent
Ferguson et al.

(10) Patent No.: US 8,577,166 B1
(45) Date of Patent: Nov. 5, 2013

(54) OPTIMIZING WEB SITE IMAGES USING A FOCAL POINT

(75) Inventors: David Ferguson, El Dorado Hills, CA (US); Dani Suleman, Fremont, CA (US); Patrick Williams, Santa Cruz, CA (US); James Ratliff, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 1362 days.

(21) Appl. No.: 11/394,346

(22) Filed: Mar. 31, 2006

(51) Int. Cl.
*G06K 9/40* (2006.01)

(52) U.S. Cl.
USPC ............ 382/255; 382/276; 382/277; 382/282

(58) Field of Classification Search
USPC ......................................................... 382/255
See application file for complete search history.

(56) References Cited

U.S. PATENT DOCUMENTS

| | | | | |
|---|---|---|---|---|
| 5,495,539 | A * | 2/1996 | Sieverding ..................... | 382/276 |
| 5,710,839 | A * | 1/1998 | Cok .............................. | 382/264 |
| 5,901,253 | A * | 5/1999 | Tretter ......................... | 382/289 |
| 5,929,867 | A * | 7/1999 | Herbstman et al. ........... | 345/474 |
| 5,933,543 | A * | 8/1999 | Cok .............................. | 382/264 |
| 6,028,603 | A * | 2/2000 | Wang et al. ................... | 715/776 |
| 6,049,636 | A * | 4/2000 | Yang ............................. | 382/289 |
| 6,456,732 | B1 * | 9/2002 | Kimbell et al. ............... | 382/112 |
| 6,587,596 | B1 * | 7/2003 | Haeberli ....................... | 382/283 |
| 6,898,316 | B2 * | 5/2005 | Zhou ............................. | 382/190 |
| 6,934,698 | B2 * | 8/2005 | Judd et al. .............................. | 1/1 |
| 7,034,848 | B2 * | 4/2006 | Sobol ............................ | 345/620 |
| 7,454,711 | B2 * | 11/2008 | Angiulo et al. ................ | 715/760 |
| 7,634,715 | B2 * | 12/2009 | Hertzfeld et al. .............. | 715/201 |
| 7,656,543 | B2 * | 2/2010 | Atkins .......................... | 358/1.13 |
| 7,668,835 | B2 * | 2/2010 | Judd et al. ................. | 707/999.01 |
| 7,978,918 | B2 * | 7/2011 | Scalise et al. ................. | 382/228 |
| 2001/0006560 | A1 * | 7/2001 | Gilman et al. ................ | 382/162 |
| 2001/0048447 | A1 * | 12/2001 | Jogo ............................. | 345/620 |
| 2002/0044154 | A1 * | 4/2002 | Baar et al. ..................... | 345/660 |
| 2002/0113862 | A1 * | 8/2002 | Center et al. ............... | 348/14.08 |
| 2002/0135621 | A1 * | 9/2002 | Angiulo et al. ................ | 345/838 |
| 2003/0012414 | A1 * | 1/2003 | Luo ............................... | 382/118 |
| 2003/0035578 | A1 * | 2/2003 | Dupin et al. .................. | 382/167 |
| 2003/0147563 | A1 * | 8/2003 | Liu et al. ....................... | 382/276 |
| 2004/0001636 | A1 * | 1/2004 | Miceli et al. .................. | 382/235 |
| 2004/0032599 | A1 * | 2/2004 | Atkins et al. .................. | 358/1.9 |
| 2004/0076342 | A1 * | 4/2004 | Wolff et al. ................... | 382/294 |

(Continued)

OTHER PUBLICATIONS

B. Suh et al., "Automatic thumbnail cropping and its effectiveness", 203, Symposium on User Interface Software and Technology archive Proceedings of the 16th annual ACM symposium on User interface software and technology, pp. 95-104.*

(Continued)

*Primary Examiner* — Gandhi Thirugnanam
(74) *Attorney, Agent, or Firm* — Harrity & Harrity, LLP

(57) ABSTRACT

A method may include providing an image to be adjusted, enabling selection of a focal point of the image, and adjusting the image based on the focal point of the image. The method may include providing the image to be displayed within an image template of a web page. The method may also include comparing dimensions of the image with dimensions of the image template, and adjusting the image based on the focal point of the image and based on the comparison the dimensions of the image to the dimensions of the image template. The method may further include providing the adjusted image within the image template of the web page.

20 Claims, 17 Drawing Sheets

(56) References Cited

U.S. PATENT DOCUMENTS

| | | | |
|---|---|---|---|
| 2004/0170337 A1* | 9/2004 | Simon et al. | 382/254 |
| 2004/0190059 A1* | 9/2004 | Winter et al. | 358/1.15 |
| 2005/0007382 A1* | 1/2005 | Schowtka | 345/619 |
| 2005/0190202 A1* | 9/2005 | Suzuki et al. | 345/660 |
| 2006/0078226 A1* | 4/2006 | Zhou | 382/298 |
| 2006/0103891 A1* | 5/2006 | Atkins | 358/450 |
| 2006/0188173 A1* | 8/2006 | Zhang et al. | 382/276 |
| 2006/0197963 A1* | 9/2006 | Royal et al. | 358/1.2 |
| 2006/0240873 A1* | 10/2006 | You et al. | 455/566 |
| 2006/0279655 A1* | 12/2006 | Chen et al. | 348/441 |
| 2007/0024909 A1* | 2/2007 | Hanechak | 358/1.18 |
| 2008/0112621 A1* | 5/2008 | Gallagher et al. | 382/190 |
| 2008/0175431 A1* | 7/2008 | Hayashi | 382/100 |

OTHER PUBLICATIONS

M. zhang et al., "Auto Cropping for Digital Photographs", 2005, IEEE Conf. on Multimedia and Expo, p. 1-4.*

H. Liu et al., "Automatic browsing of large pictures on mobile devices", 2003, In Proceedings of the eleventh ACM international conference on Multimedia, ACM, 148-155.*

V. Setlur et al.., "Automatic image retargeting", 2005, In the Mobile and Ubiquitous Multimedia (MUM), ACM, p. 59-68.*

Adobe Systems Incorporated; "Adobe Photoshop Elements—User Guide"; 2001; 49 pages.

* cited by examiner

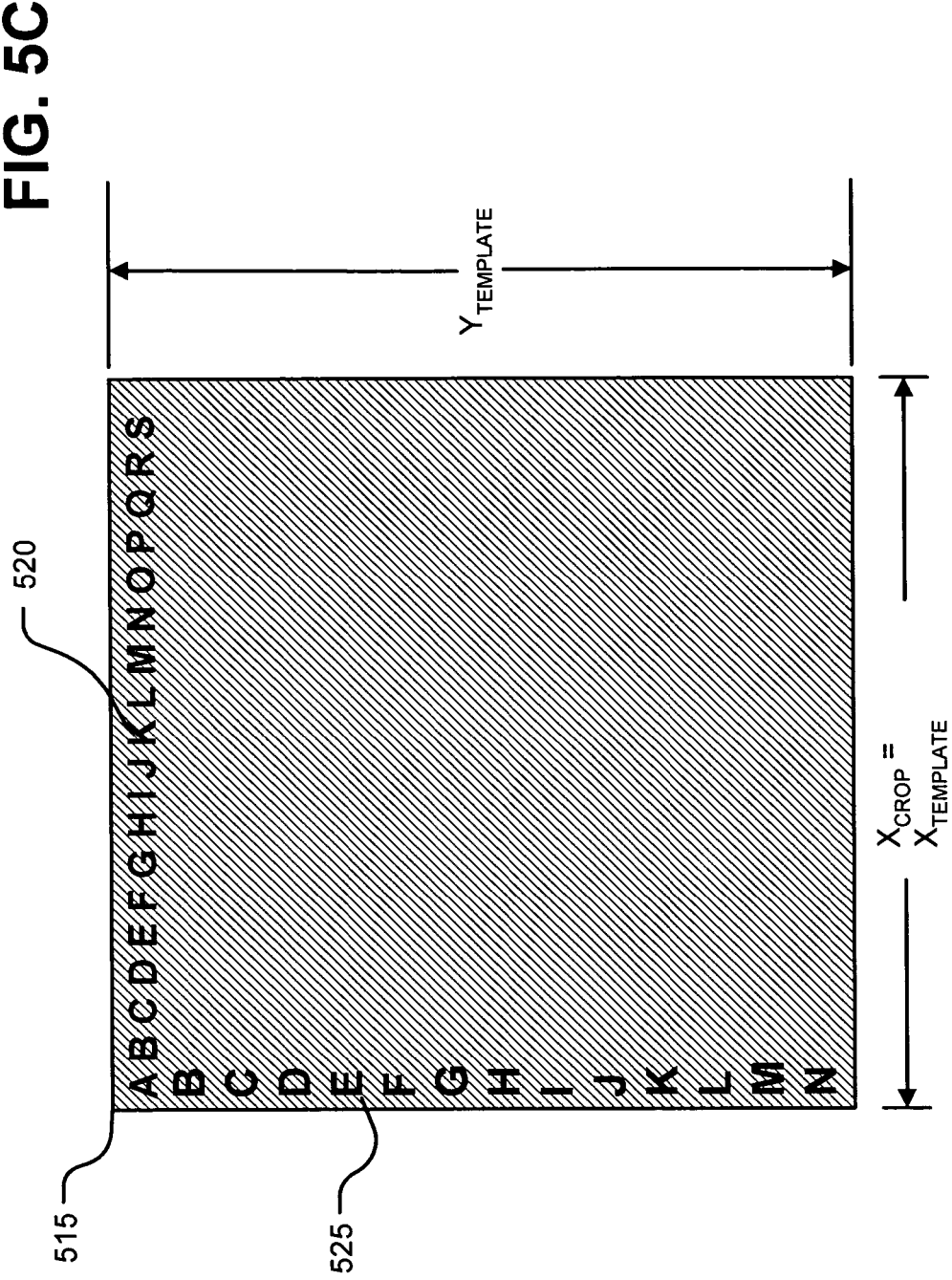

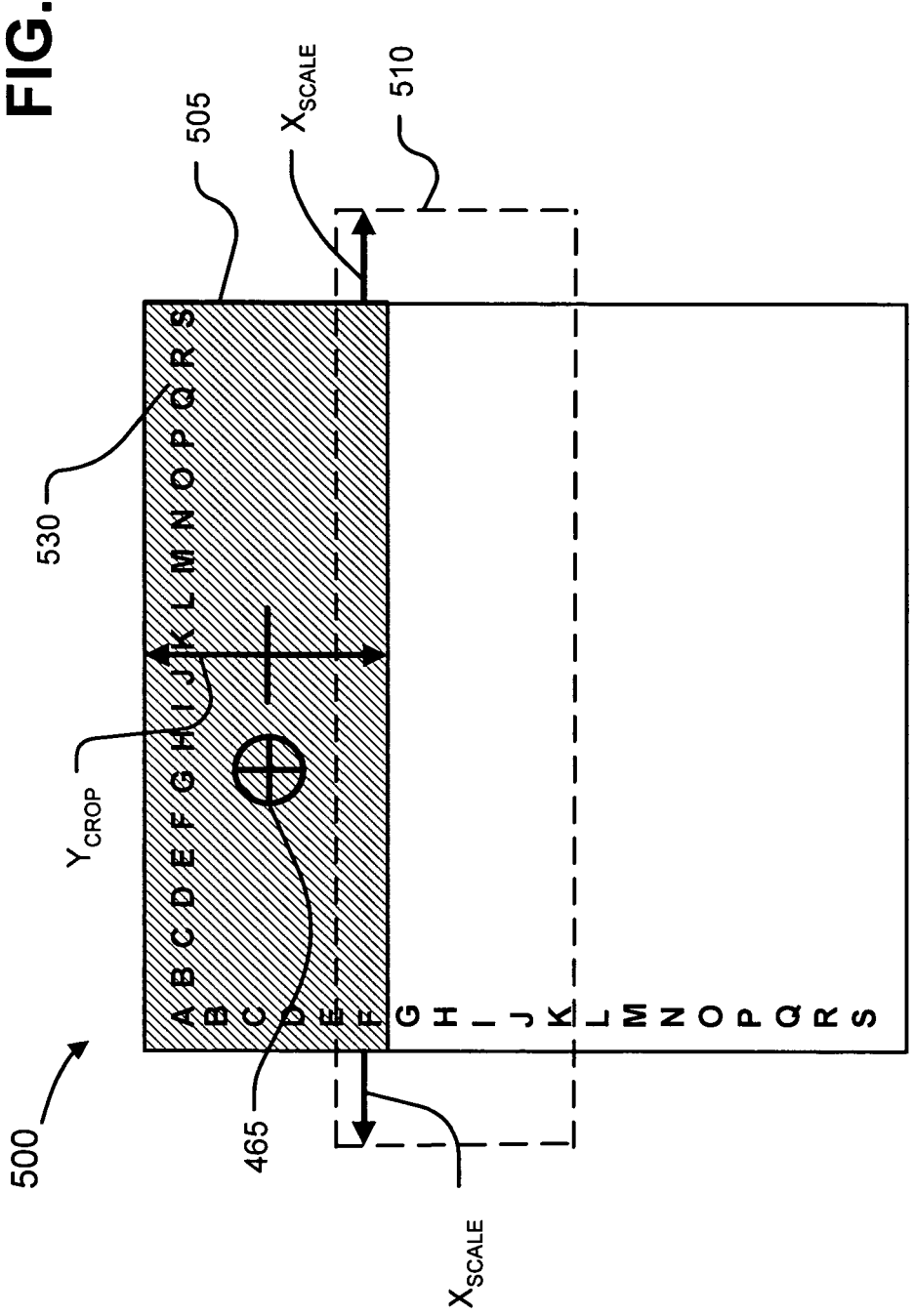

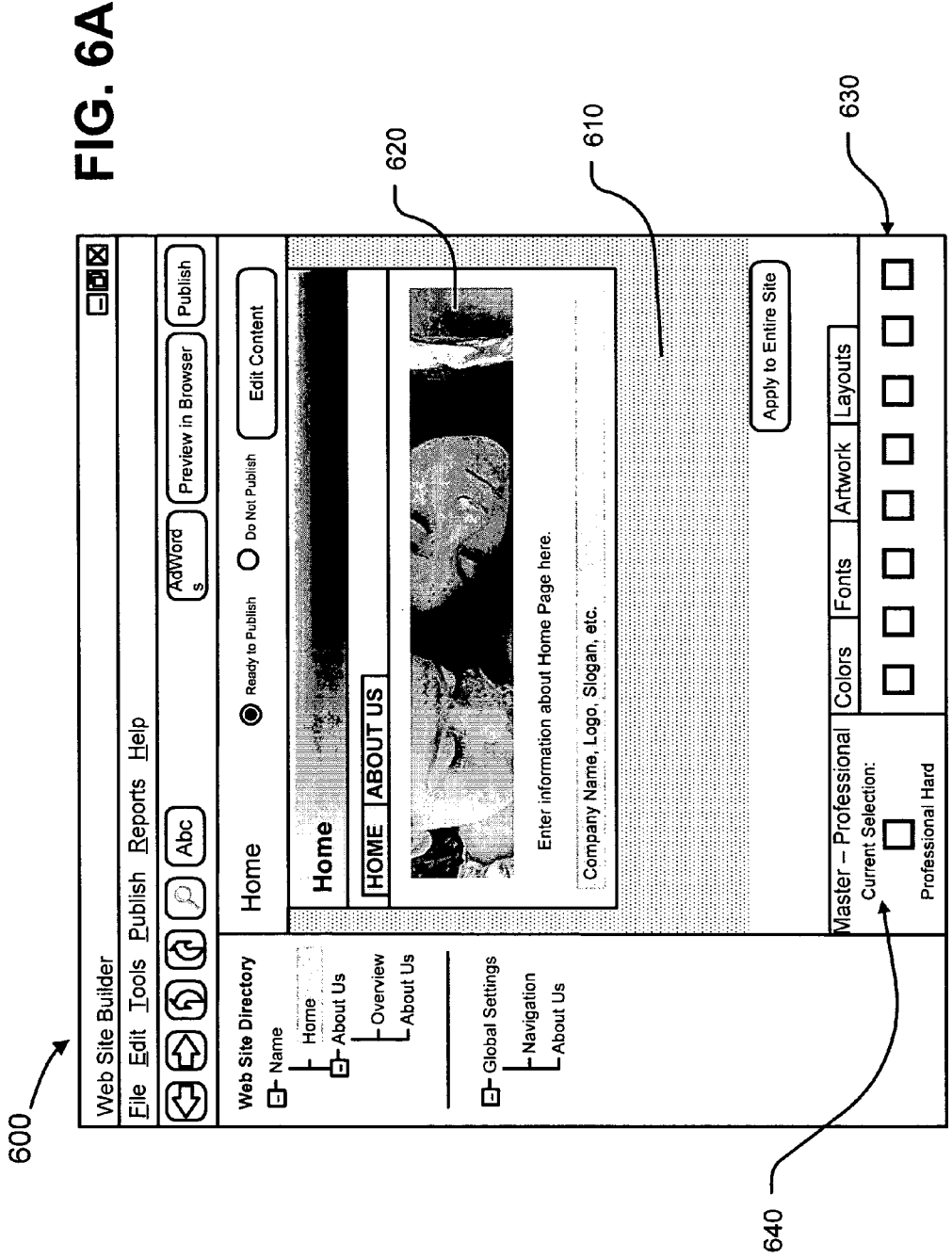

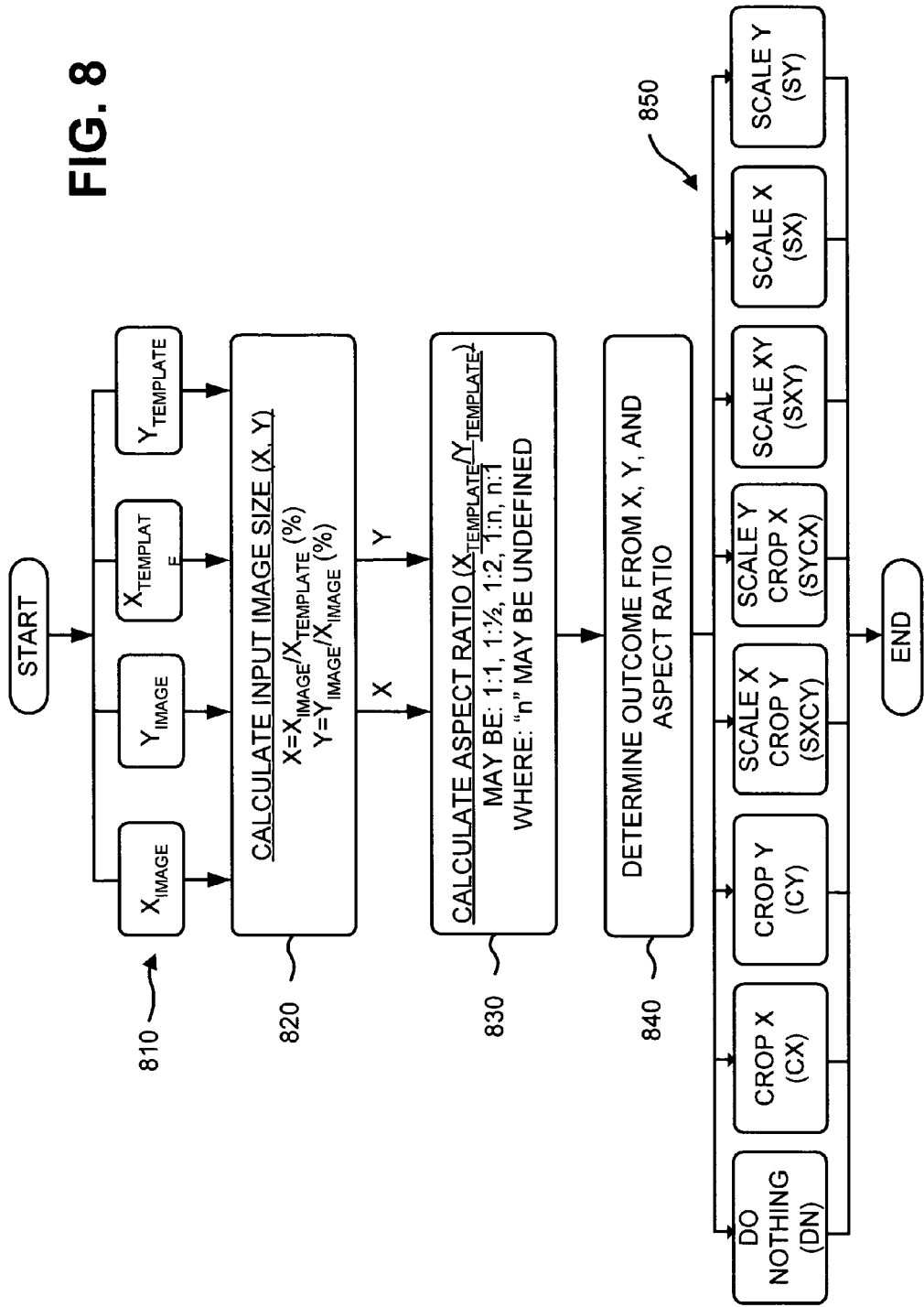

OPTIMIZING WEB SITE IMAGES USING A FOCAL POINT

BACKGROUND

1. Field of the Invention

Implementations described herein relate generally to web site images and, more particularly, to optimizing web site images using a focal point.

2. Description of Related Art

Many web site builder (or creation) products offer web page templates that a user may manipulate to create web pages for a web site. Such templates offer, for example, layout options, text input, image input, etc. Properly placing images within a web page template is typically difficult unless a professional web page designer adjusts (e.g., through scaling, cropping, skewing, positioning, etc.) the image to fit within the visual elements of the web page. For example, often times an image template of a web page template is dimensionally smaller than the image a user desires to display within the image template. For someone wishing to create a web site with no experience, this may become a significant barrier to producing a high quality web site. In addition, a change in the web page template typically requires that all of the images be readjusted by the user.

Many image manipulation products (e.g., Adobe® Photoshop®) and web site builder products (e.g., Adobe® DreamWeaver, Microsoft® Frontpage, etc.) provide tools for adjusting images so that the images will fit properly within a web page. Unfortunately, these products make the process of adjusting the images a manual process. Depending upon the number of images to be placed within a web site, this manual process may take an inordinate amount of time, cause much frustration, and still result in an inferior web site being produced.

SUMMARY

According to one aspect, a method may include providing a digital image to be adjusted, enabling selection of a focal point of the image, and adjusting the image based on the focal point of the image.

According to another aspect, a method may include providing an image to be displayed within an image template of a web page, and enabling selection of a focal point of the image. The method may also include comparing dimensions of the image with dimensions of the image template, and adjusting the image based on the comparison and the focal point of the image. The method may further include providing the adjusted image within the image template of the web page.

According to yet another aspect, a computer-readable medium may store computer-executable code for adjusting an image. The code may include instructions for providing an image to be provided within predetermined dimensions, and instructions for enabling selection of a focal point of the image. The code may also include instructions for comparing dimensions of the image with the predetermined dimensions, and instructions for adjusting the image based on the comparison and the focal point of the image.

According to a further aspect, a computer-readable medium may store computer-executable code for adjusting an image. The code may include instructions for providing a thumbnail of an image to be provided within predetermined dimensions, and instructions for using the thumbnail to enable selection of a focal point of the image. The code may also include instructions for comparing dimensions of the image with the predetermined dimensions, and instructions for adjusting the image based on the comparison and the focal point of the image.

According to another aspect, a computer-readable medium may store computer-executable code for adjusting an image. The code may include instructions for providing a preview image of an image to be provided within predetermined dimensions, and instructions for using the preview image to enable selection of a focal point of the image. The code may also include instructions for comparing dimensions of the image with the predetermined dimensions, and instructions for adjusting the image based on the comparison and the focal point of the image.

According to still another aspect, a method may include enabling selection of a focal point of an image to be displayed within a portion of a web page having predetermined dimensions. The method may also include comparing dimensions of the image with the predetermined dimensions of the portion of the web page, and using the comparison of the image dimensions with the predetermined dimensions to determine rules for adjusting the image. The method may further include adjusting the image based on the rules and the focal point of the image, and providing the adjusted image within the portion of the web page, the adjusted image including at least the focal point of the image.

According to another aspect, a system may include means for providing an image to be displayed within an image template, and means for enabling selection of a focal point of the image. The system may also include means for comparing dimensions of the image with dimensions of the image template, and means for adjusting the image based on the comparison and the focal point of the image. The system may further include means for providing the adjusted image within the image template.

According to yet another aspect, a device may include a memory to store instructions, and a processor to execute the instructions. The processor may execute the instructions to provide an image to be provided within predetermined dimensions, and enable selection of a focal point of the image. The processor may also execute the instructions to compare dimensions of the image with the predetermined dimensions, and adjust the image based on the comparison and the focal point of the image.

According to still yet another aspect, a method may include providing a plurality of images of a video or animation sequence, enabling selection of focal points of at least the first and last images of the video or animation sequence, and adjusting at least the first and last images of the video or animation sequence based on the selected focal points.

According to a further aspect, a method may include providing an electronic media item, enabling selection of a focal point of the electronic media item, and adjusting the electronic media item based on the focal point of the electronic media item.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5A-5E are exemplary diagrams of exemplary implementations for optimizing web site images using a focal point;

FIGS. 6A and 6B are exemplary diagrams of exemplary implementations of web sites that may include images optimized using a focal point;

FIG. 8 is an exemplary flowchart of an exemplary implementation for optimizing web site images using a focal point.

DETAILED DESCRIPTION

The following detailed description of the invention refers to the accompanying drawings. The same reference numbers in different drawings may identify the same or similar elements. Also, the following detailed description does not limit the invention.

Overview

Implementations consistent with the principles of the invention may relate to techniques for optimizing an image for a web site using a focal point of the image. By using a single piece of information (e.g., the focal point of the image to be inserted within a web page), high quality web pages, containing a user-supplied image(s), may be generated without having to manually adjust the image(s). For example, a user may decide to insert an image within an image template of a web page builder product. To accomplish this, the user may import the image and may choose a focal point of the image. A "focal point" of an image may be any portion of the image that the user desires to be displayed within the web page, and/or any portion of the image that the user desires to be a primary focus. For example, a focal point may include a face, a logo, certain words, a prominent image feature, and/or any image feature the user desires to be included for display within the web page. The focal point of the image may be automatically set to be the center of the image, and/or the user may select the focal point of the image. Once the focal point is set, the image may be automatically adjusted to fit within the web page and/or may include at least that portion of the image deemed to be the focal point.

The description to follow will describe an image optimization technique as it is used with a web site builder product. It should be understood that the description may equally apply to other image manipulation products. For example, the image optimization technique may used with any web site builder product (e.g., Adobe® DreamWeaver, Microsoft® Frontpage, Yahoo!® SiteBuilder, etc.) and/or any image manipulation product (Adobe® Photoshop®, Microsoft® Digital Image Suite, Corel® CorelDRAW Graphics Suite, MicroGraphix® Picture Publisher, etc.).

Figure 1:
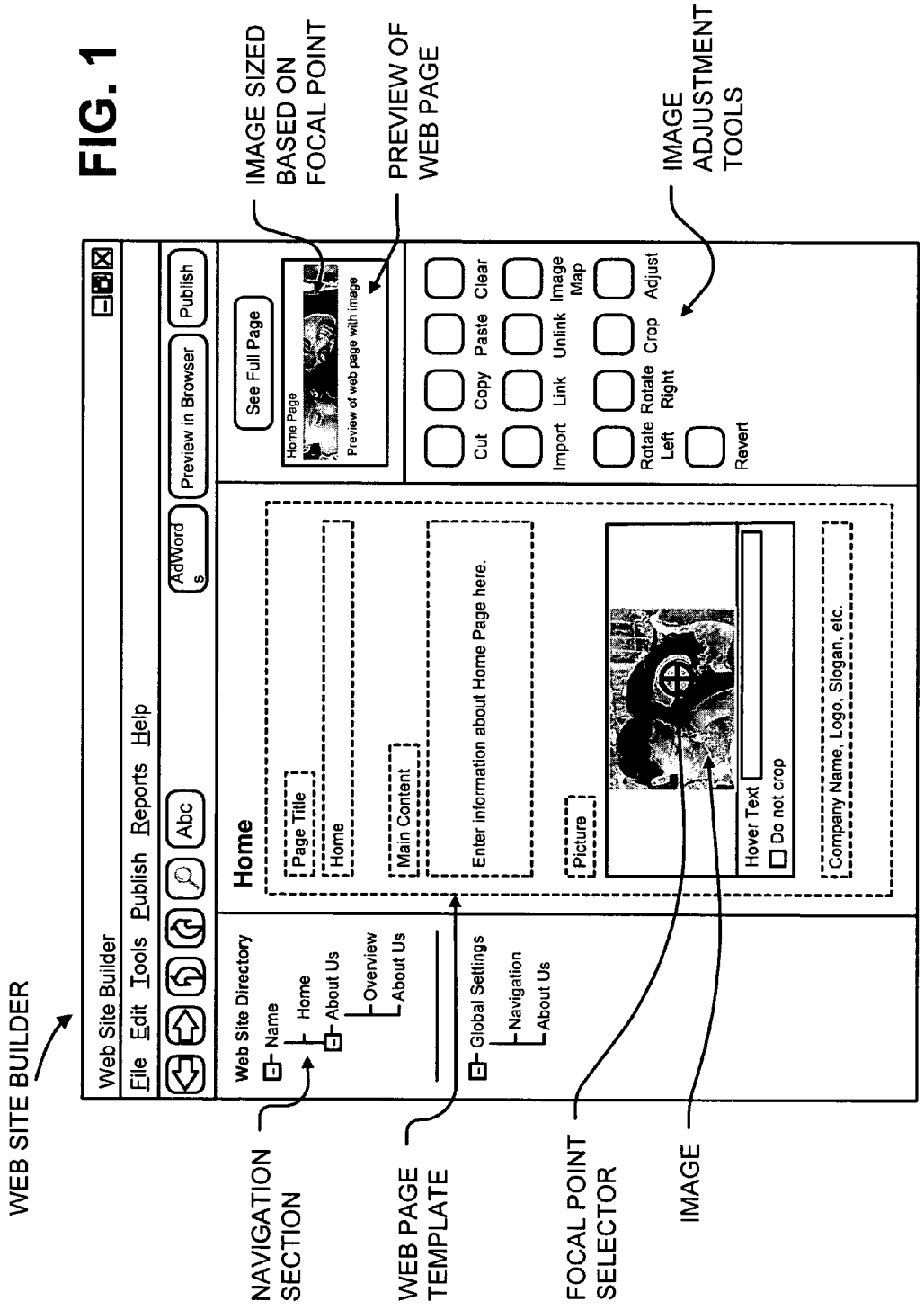
FIG. 1 is an exemplary diagram illustrating concepts consistent with the principles of the invention.

FIG. 1 is an exemplary diagram illustrating concepts consistent with the principles of the invention. As shown in FIG. 1, a web site builder product may include a navigation section, a web page template, a section to preview a web page, and image adjustment tools. The navigation section may include tools that may aid in the navigation of web pages of the web site being created. For example, the navigation section may include a tree providing a list of web page templates that a user may select from in order to view the contents of a web page template.

The web page template may provide a template that may aid in the web page creation process. For example, as shown in FIG. 1, the web page template may provide a template for a home page. The home page template may include a page title section for entering the title of the web page, and/or a main content section for entering information about the home page (e.g., company description, services provided, etc.). The home page template may include a picture section for inserting an image within the web page, and/or a section for inputting a company name, logo, slogan, copyright information, trademark information, etc.

The picture section may display the selected image and/or may display a focal point selector. The focal point selector may initially be provided in the center of the image and/or may be manipulated to select a focal point of the image. Once the focal point is selected, the image may be automatically adjusted to fit within the web page and/or may include at least that portion of the image deemed to be the focal point.

The web page preview section may include a window that may provide a preview of the web page. The preview of the web page may contain the information inputted into the web page template, including the selected image. The preview of the web page may display the selected image as an adjusted image, i.e., after the image has been automatically adjusted based on the selected focal point. For example, as shown in FIG. 1, the selected image may have a height (a "y" dimension and/or a vertical dimension) and/or a width (an "x" dimension and/or a horizontal dimension) that is larger than the height and/or width of the section of the web page where the image may be displayed. The image may be automatically adjusted to fit within the web page based on the selected focal point and/or may include at least that portion of the image deemed to be the focal point.

The image adjustment tools may include a variety of tools that may aid in the manipulation of an image. For example, the image adjustment tools may include tools to cut, copy, paste, clear, import, link, unlink, image map, rotate left, rotate right, crop, adjust, and/or revert the image. These manual image adjustment tools may optionally be used in addition to the automatic image adjustment.

Exemplary Device Architecture

Figure 2:
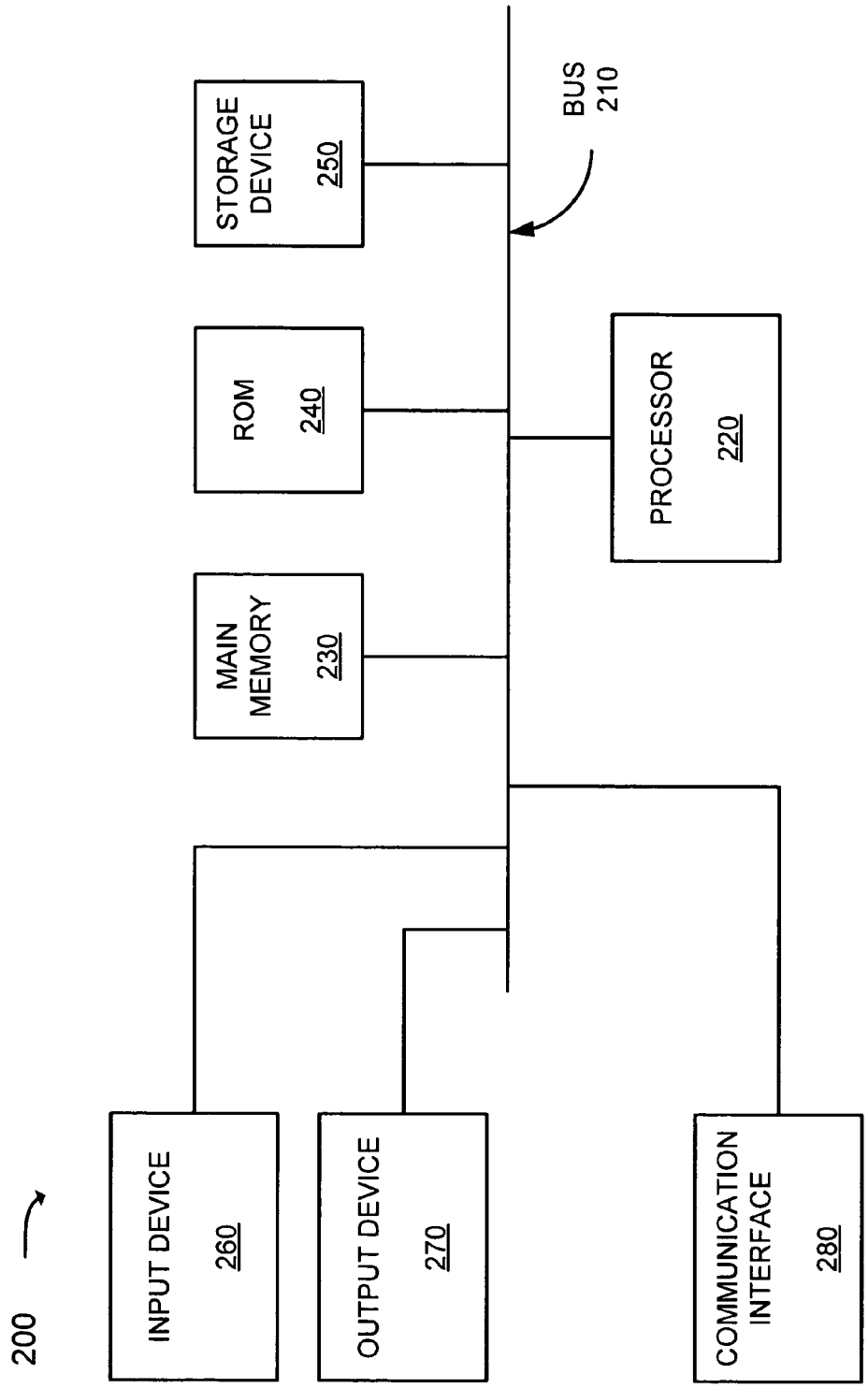
FIG. 2 is an exemplary diagram of a device in which systems and methods consistent with the principles of the invention may be implemented.

FIG. 2 is an exemplary diagram of a device 200 that may be used with aspects of the invention. A device may be defined as a personal computer, a wireless telephone, a personal digital assistant (PDA), a lap top, or another type of computation or communication device.

The device 200 may include a bus 210, a processor 220, a main memory 230, a read only memory (ROM) 240, a storage device 250, an input device 260, an output device 270, and a communication interface 280. Bus 210 may include a path that permits communication among the elements of device 200.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

The device 200, consistent with the principles of the invention, may perform certain operations, as described in detail below. The device 200 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 3:
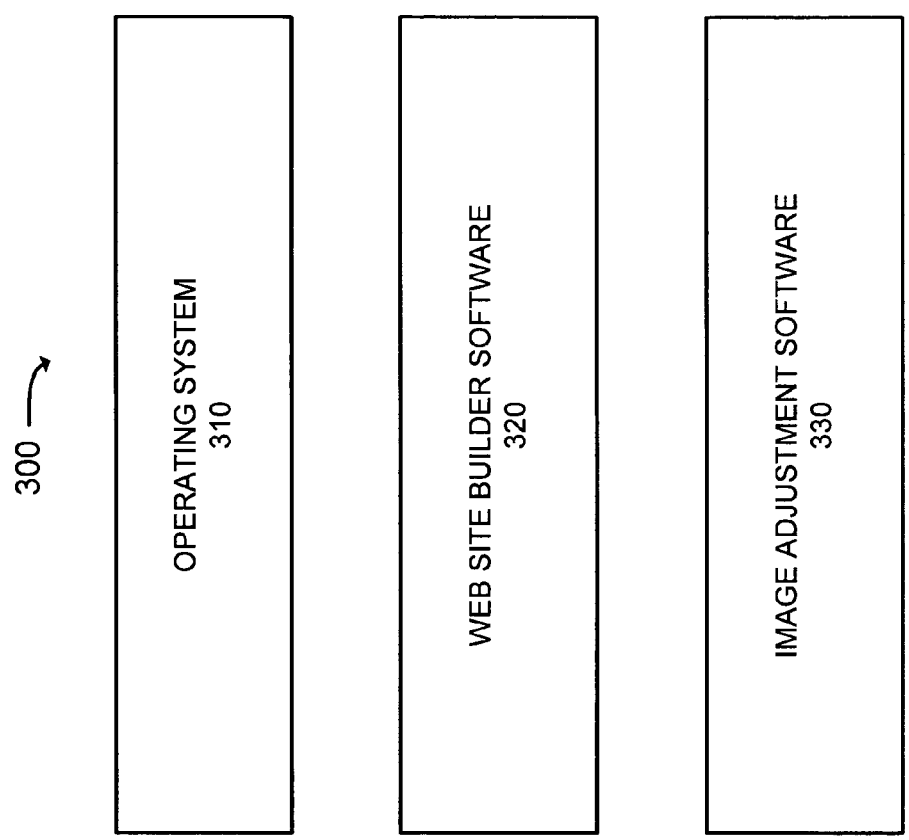
FIG. 3 is a diagram of a portion of an exemplary computer-readable medium that may be used by the device of FIG. 2.

FIG. 3 is a diagram of a portion of an exemplary computer-readable medium 300 that may be used by a device, such as device 200. In one implementation, computer-readable medium 300 may correspond to memory 230 of device 200. The portion of computer-readable medium 300 illustrated in FIG. 3 may include an operating system 310, web site builder software 320, and image adjustment software 330. Web site builder software 320 and/or image adjustment software 330 may be included in operating system 310 or may be separate from operating system 310. Image adjustment software 330 may be included in web site builder software 320 or may be separate from web site builder software 320.

Operating system 310 may include operating system software, such as the Microsoft Windows®, Apple MAC OS®, Linux®, Unix®, IBM OS/2®, and/or operating systems for personal digital assistants, cell phones, or other types of computation of communication devices.

Web site builder software 320 may include an executable object or process. Device 200 may obtain the executable object or process from a server or from a third party, such as a third party server, disk, tape, network, CD-ROM, etc. Alternatively, the executable object or process may be pre-installed on device 200.

Web site builder software 320 may permit creation of a web site and/or web page(s) and may include any web site builder software, such as Adobe® DreamWeaver, Microsoft® Frontpage, Yahoo!® SiteBuilder, etc. Web site builder software 320 may further include any image manipulation product, such as Adobe® Photoshop®, Microsoft® Digital Image Suite, Corel® CorelDRAW Graphics Suite, MicroGraphix® Picture Publisher, etc.

Web site builder software 320 may be automatically activated upon initiation of operating system 310. Alternatively, web site builder software 320 may be activated when instructed by a user. In either case, web site builder software 320 may permit creation of a web site and/or web page(s), as will be described below.

Image adjustment software 330 may include an executable object or process. Device 200 may obtain the executable object or process from a server or from a third party, such as a third party server, disk, tape, network, CD-ROM, etc. Alternatively, the executable object or process may be pre-installed on device 200.

Image adjustment software 330 may permit automatic adjustment of a web site image using a focal point of the image. Image adjustment software 330 may operate in conjunction with web site builder software 320. In another implementation, image adjustment software 330 may be part of web site builder software 320. In this latter implementation, web site builder software 320 may perform the functions of image adjustment software 330. In yet another implementation, image adjustment software 330 may be a process separate from operating system 310 and/or web site builder software 320.

Image adjustment software 330 may be automatically activated upon initiation of operating system 310 and/or web site builder software 320. Alternatively, image adjustment software 330 may be activated when instructed by a user. In either case, image adjustment software 330 may permit automatic adjustment of a web site image using a focal point of the image, as will be described below.

Exemplary Image Importing and Focal Point Selection

Figure 4A:
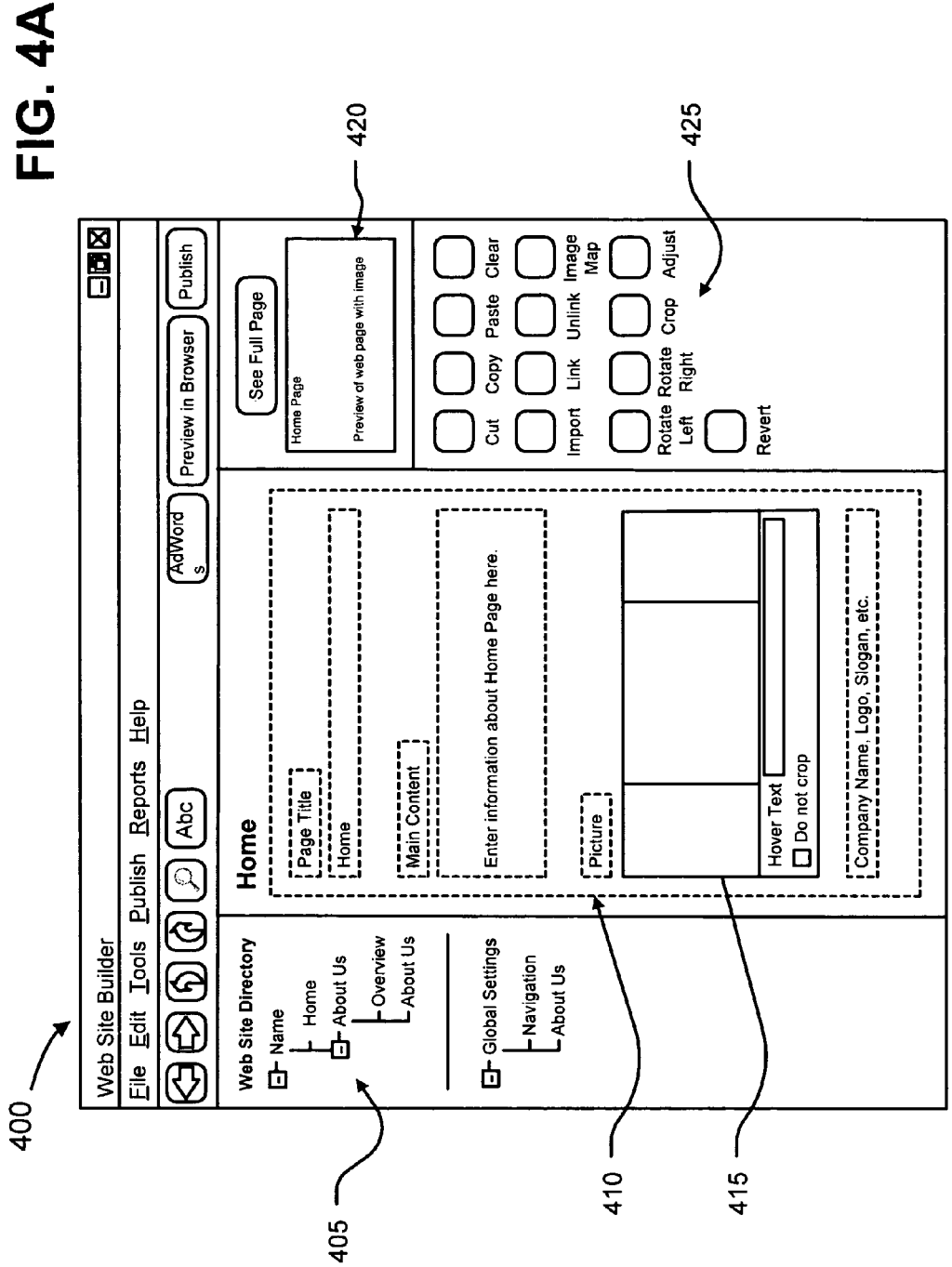
FIGS. 4A-4E are exemplary diagrams of exemplary implementations for inputting and/or optimizing web site images using a focal point.

There are a number of ways that a user could import an image and/or select a focal point of the image so that the image may be automatically adjusted to fit within a web page. FIGS. 4A-4E are exemplary diagrams of exemplary implementations for inputting and/or optimizing a web page image using a focal point. As shown in FIG. 4A, a web site builder 400 (e.g., web site builder software 320) may include a navigation section 405, a web page template 410, a web page preview section 420, and image adjustment tools 425. Navigation section 405 may include tools that may aid in the navigation of web pages of the web site being created. For example, navigation section 405 may include a tree providing a list of web page templates that a user may select from in order to view the contents of a web page template.

Web page template 410 may provide a template of a web page to aid in the web page creation process. For example, as shown in FIG. 4A, web page template 410 may provide a template for a home page. The home page template may include a page title section for entering the title of the web page, and/or a main content section for entering information about the home page (e.g., company description, services provided, etc.). The home page template may include a picture section 415 for inserting an image within the web page, and/or a section for inputting a company name, logo, slogan, copyright information, trademark information, etc. Picture section 415 may display the selected image.

Web page preview section 420 may include a window that may provide a preview of the web page. The preview of the web page may contain the information inputted into web page template 410, including the selected image. Image adjustment tools 425 may include a variety of tools that may aid in the manipulation of a selected image. For example, the image adjustment tools may include tools to cut, copy, paste, clear, import, link, unlink, image map, rotate left, rotate right, crop, adjust, and/or revert the selected image. These manual image adjustment tools may selectively be used in addition to the automatic image adjustment.

Figure 4B:
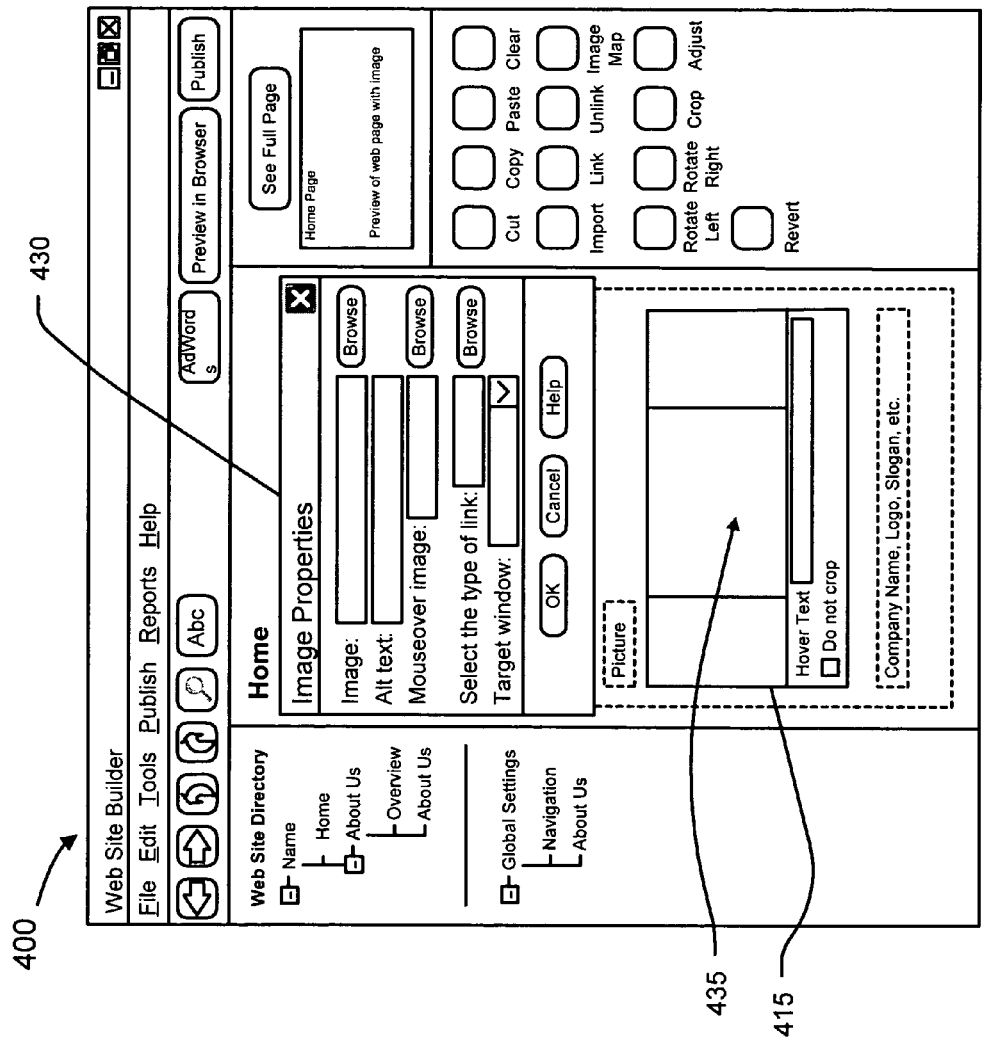

As shown in FIG. 4B, web site builder 400 may include an image properties window 430 that may enable a user to select an image to place within picture section 415 of web page template 410. Picture section 415 may include a portion 435 for displaying the selected image. Image properties window 430 may be accessed a number of ways, such as by selecting portion 435 with a pointing device (e.g., a mouse). Image properties window 430 may include a section that enables a user to select an image (i.e., "Image" section). The image may be selected from image files stored in device 200 (e.g., in main memory 230, ROM 240, and/or storage device 250), image files stored in a local network (e.g., a local area network) connected to device 200, and/or image files found, for example, on a wide area network, such as the Internet.

Image properties window 430 may include an "Alt text" section that may permit a user to enter text to be displayed when a pointing device, such as a mouse, is provided over the image in the web page. Image properties window 430 may include a "Mouseover image" section that may permit a user to select a mouseover image to be displayed when a pointing device is provided over the image in the web page.

A "Select the type of link" section may be provided in image properties window 430. The "Select the type of link" section may permit a web page image to link to another page in the web site, another web site, an email address, a file on device 200, etc. when the image is selected with a pointing device. Image properties window 430 may include a "Target window" section that may permit a user to determine where the selected image may be displayed. For example, a user may choose to display the selected image within an image template and/or within a new window on the web page.

Figure 4C:
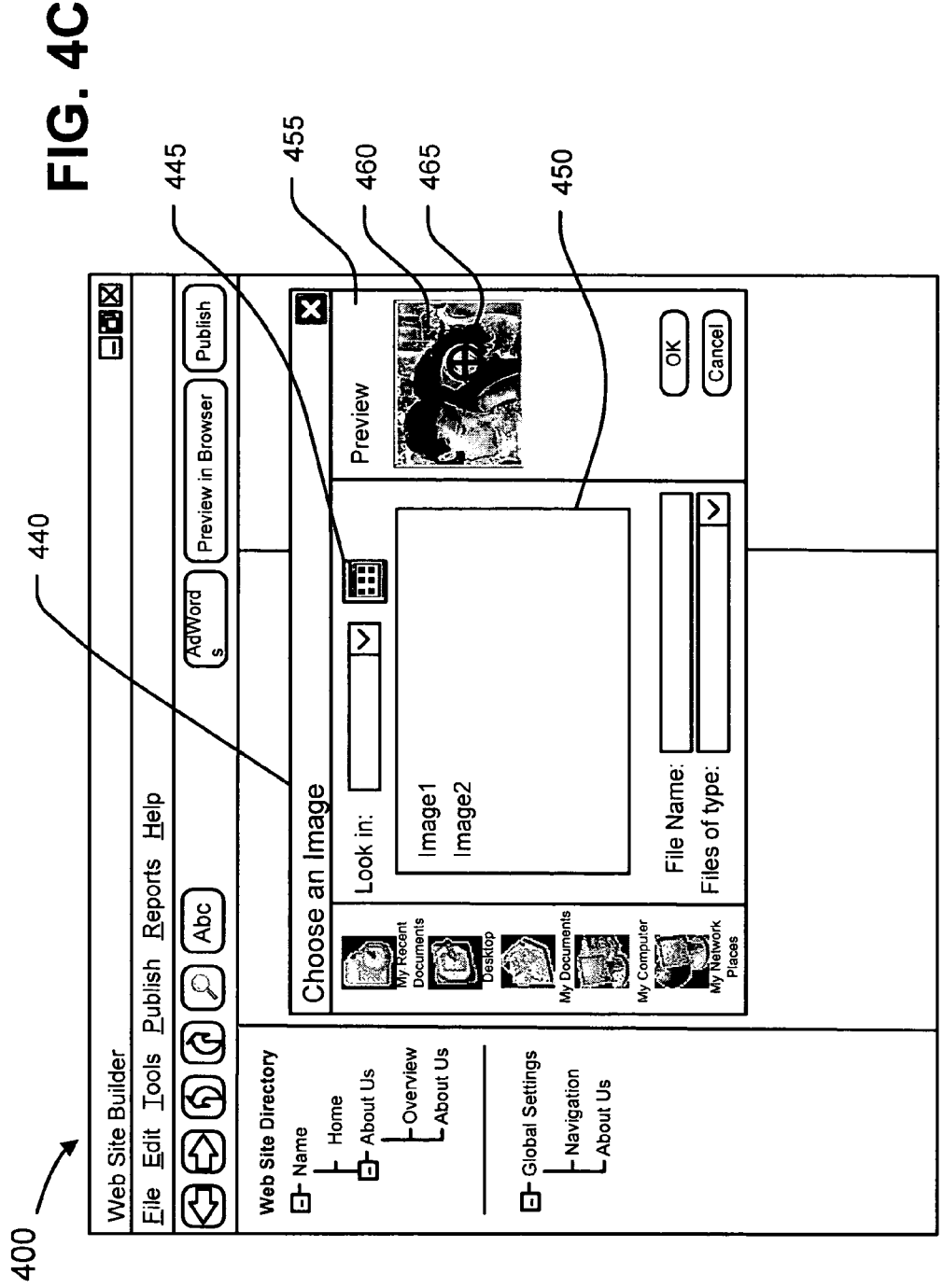

If a user selects the "Browse" button of "Image" section of image properties window 430, then an image selection window 440 may be displayed, as shown in FIG. 4C. Image selection window 440 may permit a user to select an image file from image files stored in device 200, stored in a local network connected to device 200, and/or found on a wide area network. Image selection window 440 may include a "Views" button 445 that may display image files in a number of alternative views. For example, the image files may appear in any of the alternative views provided by an operating system, e.g., image files may be displayed within Windows® "thumbnails," "tiles," "icons," "list," or "details" views. A "list" view 450 of image files is shown in FIG. 4C for exemplary purposes. A shown, two image files ("Image1" and "Image2") may be displayed and selected by a user.

In one exemplary implementation consistent with the principles of the invention, image selection window 440 may include a preview section 455 that may enable an image 460 to be previewed prior to selection. Preview section 455 may include a focal point selector 465 that may initially be provided in the center of image 460 and/or may be manipulated to select a focal point of image 460. Once the focal point is set, image 460 may be automatically adjusted to fit within the web page and/or may include at least that portion of image 460 deemed to be the focal point.

Figure 4D:
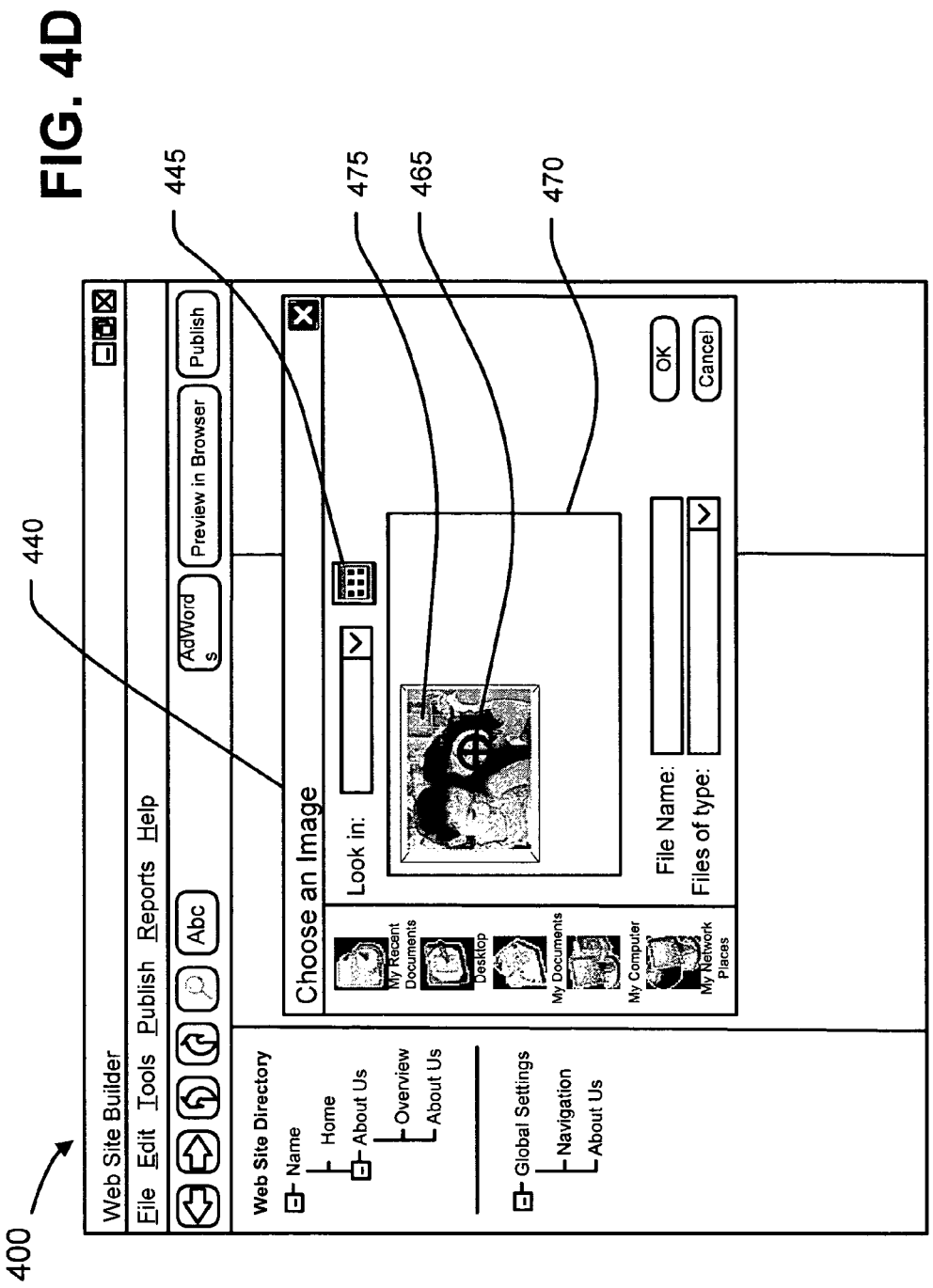

In another exemplary implementation consistent with the principles of the invention, image selection window 440, via "Views" button 445, may display a "thumbnails" view 470 that may display an image file as a thumbnail 475, as shown in FIG. 4D. A "thumbnail" may be a small picture that may be used to represent a link to a larger picture, e.g., a thumbnail may be a miniature version of the image in the image file. Focal point selector 465 may initially be provided in the center of thumbnail 475 and/or may be manipulated to select a focal point of thumbnail 475, and thus a focal point of the image. Once the focal point is set, the image may be automatically adjusted to fit within the web page and/or may include at least that portion of the image deemed to be the focal point.

Figure 4E:
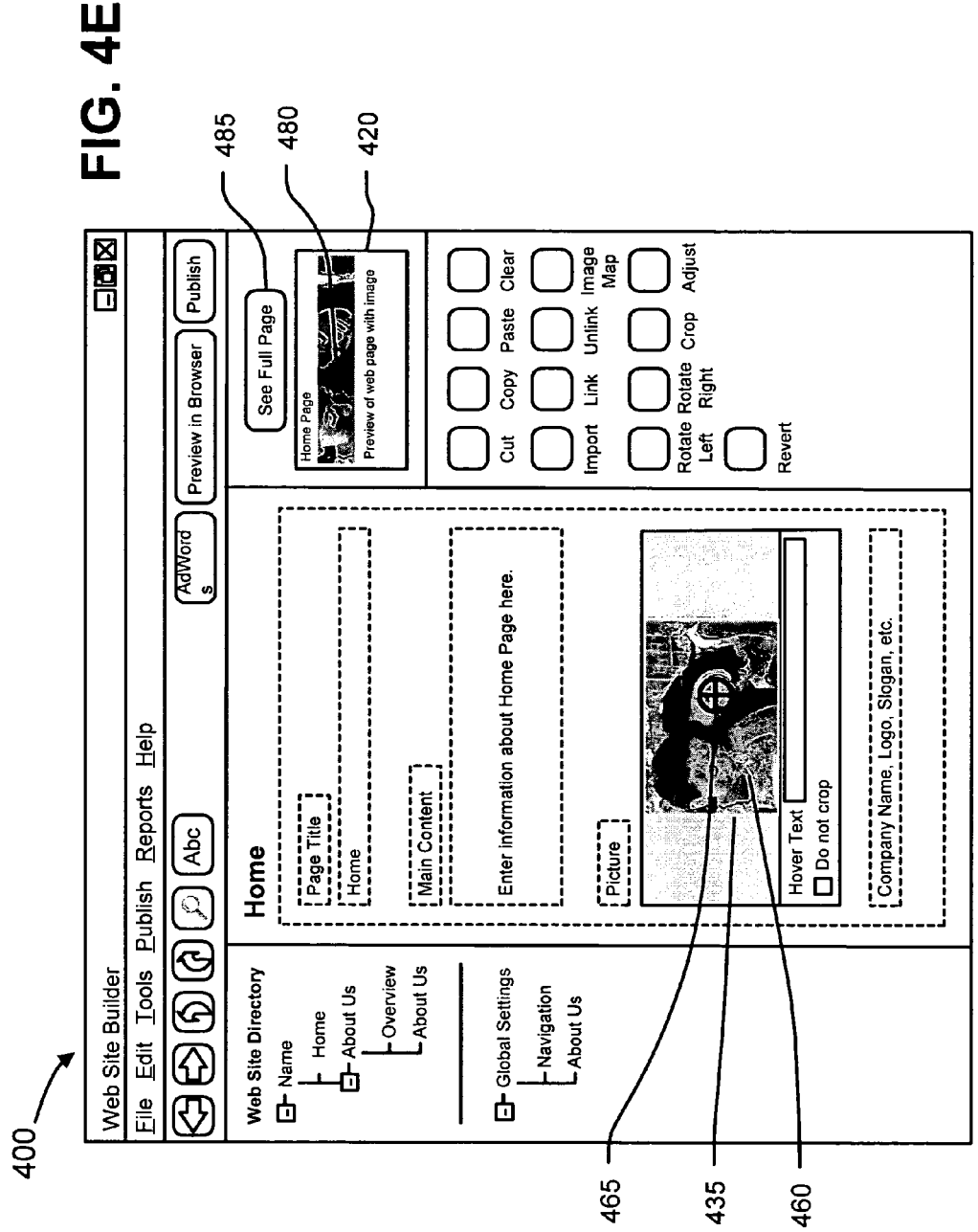

In yet another exemplary implementation consistent with the principles of the invention, the image may be selected as set forth above, but a focal point may not be set for the image. As shown in FIG. 4E, image 460 may be displayed within portion 435 of picture section 415 of web page template 410 (as shown in FIG. 4B). Focal point selector 465 may initially be provided in the center of image 460 and/or may be manipulated to select a focal point of image 460. Once the focal point is set, image 460 may be automatically adjusted to fit within the web page and/or may include at least that portion of image 460 deemed to be the focal point. The automatically adjusted image 480 may be displayed within web page preview section 420 as part of a web page preview. The full web page, with automatically adjusted image 480, may be displayed by selecting a "See Full Page" button 485.

Exemplary Focal Point-Based Image Adjustment

There are a number of ways that an image may be automatically adjusted for a web page using a focal point of an image. FIGS. 5A-5E are exemplary diagrams of exemplary implementations for optimizing web page images using a focal point.

An image may be adjusted in a variety of ways. In one implementation, for example, the original imported image may be adjusted utilizing the techniques discussed below in connection with FIGS. 5A-5E.

In another implementation, a copy of the imported image may be made, and the copy of the image may be adjusted utilizing the techniques discussed below in connection with FIGS. 5A-5E. This may permit a user in the future to change a web page template and have a new image (e.g., based on the original imported image) generated that may fit within the constraints of the newly selected web page template. Another copy of the original image may be made, and the new copy may be adjusted utilizing the techniques discussed below in connection with FIGS. 5A-5E. A user may do a complete web page makeover by selecting a new web page template, and all of the images associated with the web page (but based on the original imported images) may be automatically adjusted to fit within the new web page template.

Figure 5A:
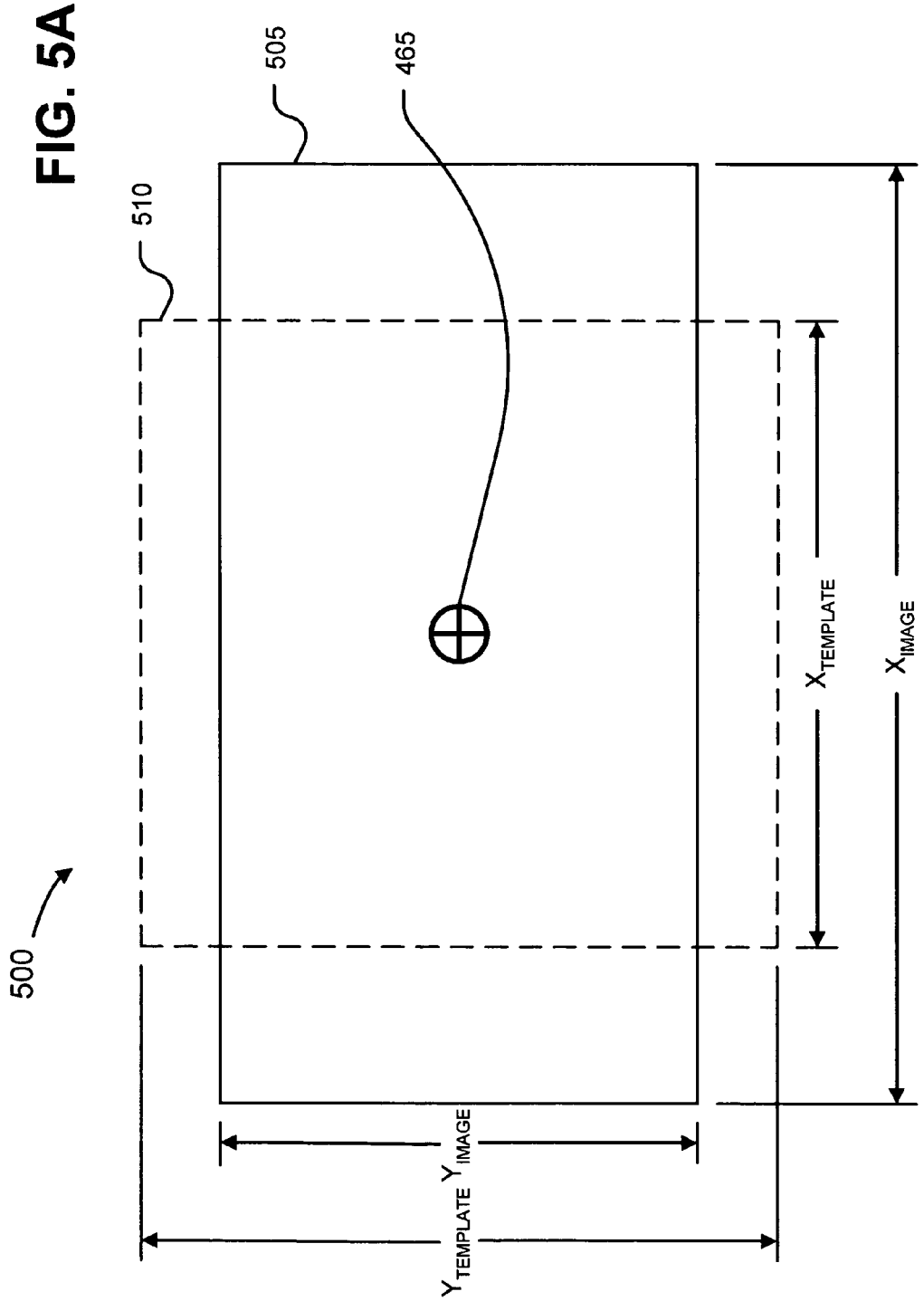

As shown in FIG. 5A, an image map 500 may be envisioned when a user attempts to place an image within a web page. Image map 500 may include an image 505 to be inserted within the web page, and a template 510 (e.g., a web page image template) that may be sized to fit within the web page and may be used to automatically adjust image 505 to fit within the web page. Focal point selector 465 may initially be provided in the center of image 505 and/or may be manipulated (e.g., using a pointing device, such as a mouse) to select a focal point of image 505. Once the focal point is set, image 505 may be automatically adjusted to fit within template 510 so that at least that portion of image 505 deemed to be the focal point may be provided within template 510.

Image 505 may include a width ($X_{IMAGE}$) and a height ($Y_{IMAGE}$). Template 510 may include a width ($X_{TEMPLATE}$) and a height ($Y_{TEMPLATE}$). As shown in FIG. 5A, for exemplary purposes, width ($X_{IMAGE}$) of image 505 may be larger than width ($X_{TEMPLATE}$) of template 510, and height ($Y_{IMAGE}$) of image 505 may be smaller than height ($Y_{TEMPLATE}$) of template 510. In this exemplary case, image 505 may be automatically adjusted to fit within template 510 by cropping width ($X_{IMAGE}$) of image 505 to fit within width ($X_{TEMPLATE}$) of template 510, and scaling height ($Y_{IMAGE}$) of image 505 to fit within height ($Y_{TEMPLATE}$) of template 510. The cropping and scaling of image 505 may be based on the selected focal point, as shown below with reference to FIGS. 5B-5E.

First Exemplary Image Adjustment

Figure 5B:
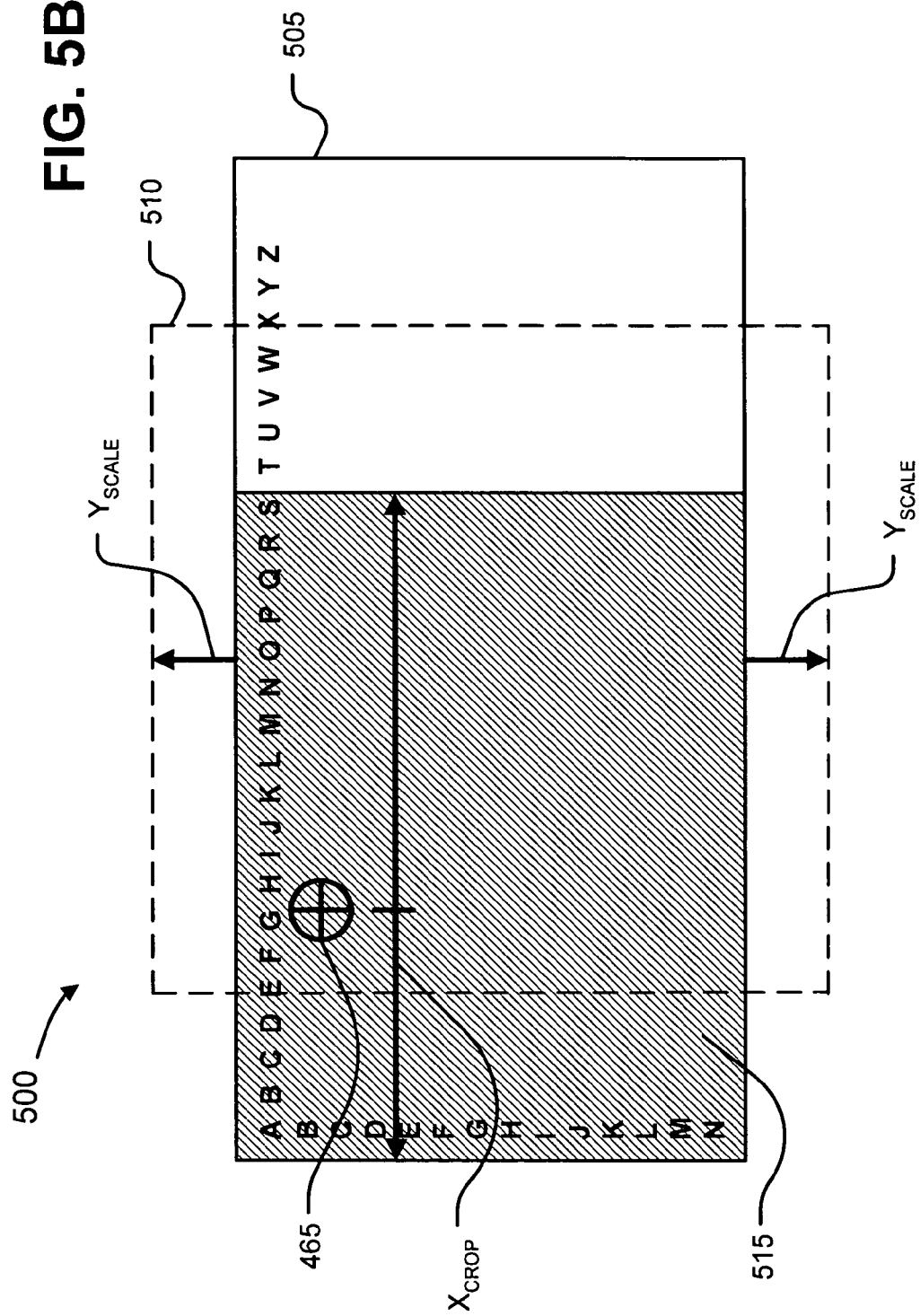

FIGS. 5B and 5C show a first exemplary implementation consistent with the principles of the invention, where the image width ($X_{IMAGE}$) may be larger than the template width ($X_{TEMPLATE}$) and the image height ($Y_{IMAGE}$) may be smaller than the template height ($Y_{TEMPLATE}$). In one implementation, the processing of FIGS. 5B and 5C may be performed by one or more software and/or hardware components within device 200. In another implementation, the processing may be performed by one or more software and/or hardware components within another device or a group of devices separate from or including device 200.

As shown in FIG. 5B, image 505 may include letters ("A" to "Z") extending horizontally (i.e., in the "x" direction), and letters ("A" to "N") extending vertically (i.e., in the "y" direction). Letters have been added to FIGS. 5B and 5C to aid in the understanding of how image 505 may be automatically adjusted based on a focal point. Focal point selector 465 may be manipulated to a portion of image 505, other than the center of image 505, to enable selection of a focal point of image 505. Once the focal point is selected, image 505 may be automatically adjusted to fit within template 510 so that at least that portion of image 505 deemed to be the focal point may be provided within template 510.

Since the width of image 505 of FIG. 5B may be larger than the width of template 510, the width of image 505 may need to be cropped to fit within template 510. A cropped width ($X_{CROP}$) of image 505 may be provided as shown in FIG. 5B. For example, cropped width ($X_{CROP}$) may be equal to template width ($X_{TEMPLATE}$) and may be determined by beginning at the focal point selected by selector 465 and extending radially outward in the positive and negative "x" directions (i.e., in the horizontal direction) until cropped width ($X_{CROP}$) eventually equals template width ($X_{TEMPLATE}$), as shown in FIG. 5C. If the focal point is not located at the center of image 505 (e.g., the focal point of FIG. 5C), then one of the rays forming cropped width ($X_{CROP}$) may eventually stop when it reaches the edge of image 505, and the other ray forming cropped width ($X_{CROP}$) may continue until cropped width ($X_{CROP}$) eventually equals template width ($X_{TEMPLATE}$). Since the height of image 505 may be smaller than the height of template 510, the height of image 505 may need to be scaled to fit within the height of template 510. This may be accomplished by extending the bottom of image 505 a distance (e.g., $Y_{SCALE}$), and by extending the top of image 505 a distance (e.g., $Y_{SCALE}$) so that image 505 may have a height equal to height ($Y_{TEMPLATE}$) of template 510, as shown in FIG. 5C.

The resulting portion of image 505 that may be provided within the web page may be shown as a shaded area 515 of image 505 in FIG. 5B. As shown in FIG. 5C, the resulting portion of image 505 (i.e., shaded area 515) may include a portion of the horizontally arranged letters 520 (i.e., letters "A" to "S"), and all of the vertically arranged letters 525 (i.e., letters "A" to "N"). The resulting portion of image 505 (shaded area 515) may have a width ($X_{CROP}$) that may equal width ($X_{TEMPLATE}$) of template 510, and a height that may equal height ($Y_{TEMPLATE}$) of template 510.

Second Exemplary Image Adjustment

Figure 5E:
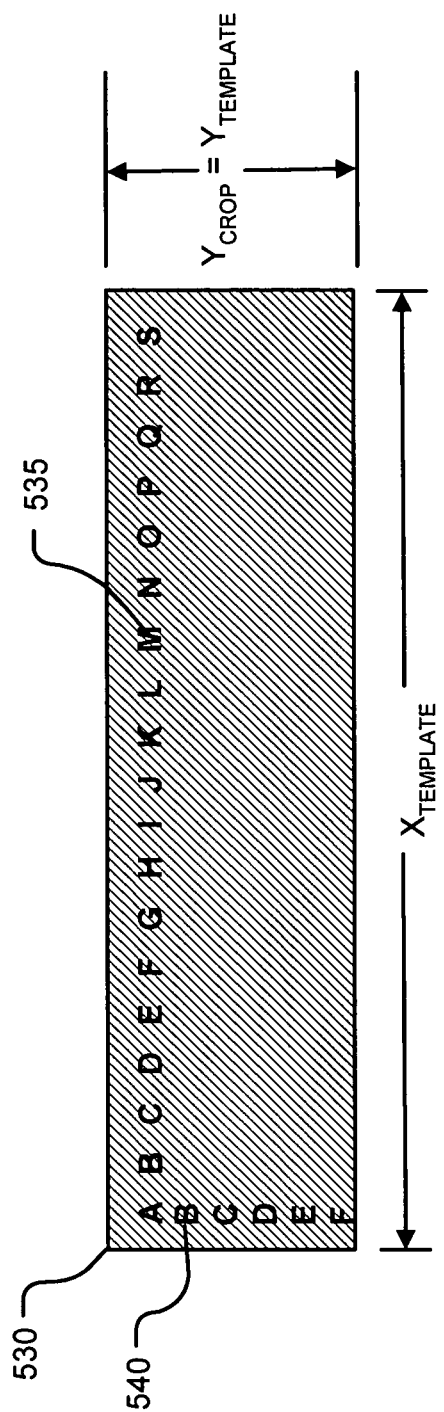

FIGS. 5D and 5E show a second exemplary implementation consistent with the principles of the invention, where the image width ($X_{IMAGE}$) may be smaller than the template width ($X_{TEMPLATE}$) and the image height ($Y_{IMAGE}$) may be larger than the template height ($Y_{TEMPLATE}$). In one implementation, the processing of FIGS. 5D and 5E may be performed by one or more software and/or hardware components within device 200. In another implementation, the processing may be performed by one or more software and/or hardware components within another device or a group of devices separate from or including device 200.

As shown in FIG. 5D, image 505 may include letters ("A" to "S") extending horizontally (i.e., in the "x" direction), and letters ("A" to "S") extending vertically (i.e., in the "y" direction). Letters have been added to FIGS. 5D and 5E to aid in the understanding of how image 505 may be automatically adjusted based on a focal point. Focal point selector 465 may be manipulated to a portion of image 505, other than the center of image 505, to enable selection of a focal point of image 505. Once the focal point is selected, image 505 may be automatically adjusted to fit within template 510 so that at least that portion of image 505 deemed to be the focal point may be provided within template 510.

Since the height of image 505 of FIG. 5B may be larger than the height of template 510, the height of image 505 may need to be cropped to fit within template 510. A cropped height ($Y_{CROP}$) of image 505 may be provided as shown in FIG. 5D. For example, cropped height ($Y_{CROP}$) may be equal to template height ($Y_{TEMPLATE}$) and may be determined by beginning at the focal point selected by selector 465 and extending radially outward in the positive and negative "y" direction (i.e., in the vertical direction) until cropped height ($Y_{CROP}$) eventually equals template height ($Y_{TEMPLATE}$), as shown in FIG. 5E. Since the width of image 505 may be smaller than the width of template 510, the width of image 505 may need to be scaled to fit within the width of template 510. This may be accomplished by extending the right side of image 505 a distance (e.g., $X_{SCALE}$), and by extending the left side of image 505 a distance (e.g., $X_{SCALE}$) so that image 505 may have a width equal to width ($X_{TEMPLATE}$) of template 510, as shown in FIG. 5E.

The resulting portion of image 505 that may be provided within the web page may be shown as a shaded area 530 of image 505 in FIG. 5D. As shown in FIG. 5E, the resulting portion of image 505 (i.e., shaded area 530) may include all of the horizontally arranged letters 535 (i.e., letters "A" to "S"), and a portion of the vertically arranged letters 540 (i.e., letters "A" to "F"). The resulting portion of image 505 (shaded area 530) may have a width that equals width ($X_{TEMPLATE}$) of template 510, and a height ($Y_{CROP}$) that equals height ($Y_{TEMPLATE}$) of template 510.

Although FIGS. 5B-5E show adjusting the dimensions of image 505 to equal the dimensions of template 510, the dimensions (e.g., the width or height) of image 505 may be adjusted to be less than the dimensions of template 510. For example, if image 505 has a height equal to the height of template 510, but the width of image 505 is much smaller than the width of template 510, then scaling the width of image 505 may create an undesirably skewed image. In such a case, the height of image 505 may also be adjusted so that the image displayed within the web page may be less skewed and more proportional.

Although FIGS. 5B-5E show cropping one dimension and scaling the other dimension of image 505, any combination of cropping and scaling may be utilized. For example, image 505 may be scaled in the "x" and "y" directions, followed by a cropping in the "x" direction and/or the "y" direction of image 505. Scaling image 505 in both directions and then cropping may maintain the fidelity of image 505.

In an alternative implementation consistent with the principles of the invention, instead of using focal point selector 465 to select the focal point, a user may identify features in an image that may be significant and are desired to be displayed within the generated web page. For example, a user may select, with a pointing device (e.g., a mouse), various significant points within the image and/or identify a significant region within the image using an area selection tool (e.g., a mouse). In another example, a prominent feature in an image may be automatically identified and/or the focal point may default to the location of the prominent feature. A user may validate the automatically selected focal point and/or select another focal point of the image.

Although the exemplary implementations show a single still image being manipulated, the image manipulation techniques described herein may be applied to more than one still image, and/or a video/animation sequence that may include a series of frames (e.g., still images). In a video/animation sequence, focal points may be identified on the start and end frames of the sequence. Additional focal points may be identified at random intervals throughout the video/animation sequence, and/or an algorithm may be used to interpolate focal points in the intermediate frames of the sequence.

Although FIGS. 5A-5E show the focal point as a single point (e.g., an x, y coordinate) in an image, the focal may assume a variety of shapes other than a single point. For example, the focal point may be linear, circular, square, rectangular, and/or any other shape, such that the focal point defines an area or a portion of an image. In one implementation, if a shape is used as a focal point in a video/animation sequence, the shape of the focal point may or may not be constant throughout the video/animation sequence. In another implementation, if a shape is used as a focal point, additional information may be stored about the relative importance of the image areas(s) within and/or bisected by the shaped focal point. For example, the focal point may be a line, where the beginning point of the line may indicate the most important portion of the image, and the terminal (end) point of the line may be an image portion of lesser importance (although of greater importance than image portions not bisected by the line).

In an implementation consistent with the principles of the invention, more than one focal point may be identified in a single image. For example, a series of focal points on a single image may be used to create a video/animation sequence.

Focal point information may be stored in a variety of locations. For example, in one implementation, focal point information may be stored as vector and/or meta data within layers and/or comment areas of its corresponding image file. In another implementation, focal point information may be stored separately from its corresponding image file.

In an implementation consistent with the principles of the invention, a three-dimensional focal point may be used to create a new camera angle for an image, video, and/or animation. For example, a z-axis of the focal point may indicate a relative level of zoon and/or a viewing angle. Multiple shapes may be used for a three-dimensional focal point to apply visual effects. For example, a fisheye lens shape may be used and may allow the focal point to be distorted.

In an implementation consistent with the principles of the invention, a focal point may be applied to a series of ordered data (e.g., a site map), and may indicate which portion(s) of the data is/are most important to the users on a site. If the focal point is multi-dimensional (e.g., a shape), then the relative importance of the areas contained within the shaped focal point may be identified. Such an arrangement may provide a mechanism for ensuring that indexing and advertisement placements may be optimal. The areas contained within a shaped focal point may receive special treatment in site navigation, and/or search results may rank documents (e.g., web pages) according to their user-defined (e.g., based on the focal point) importance.

Exemplary Web Page Displays of Automatically Adjusted Images

Figure 6B:
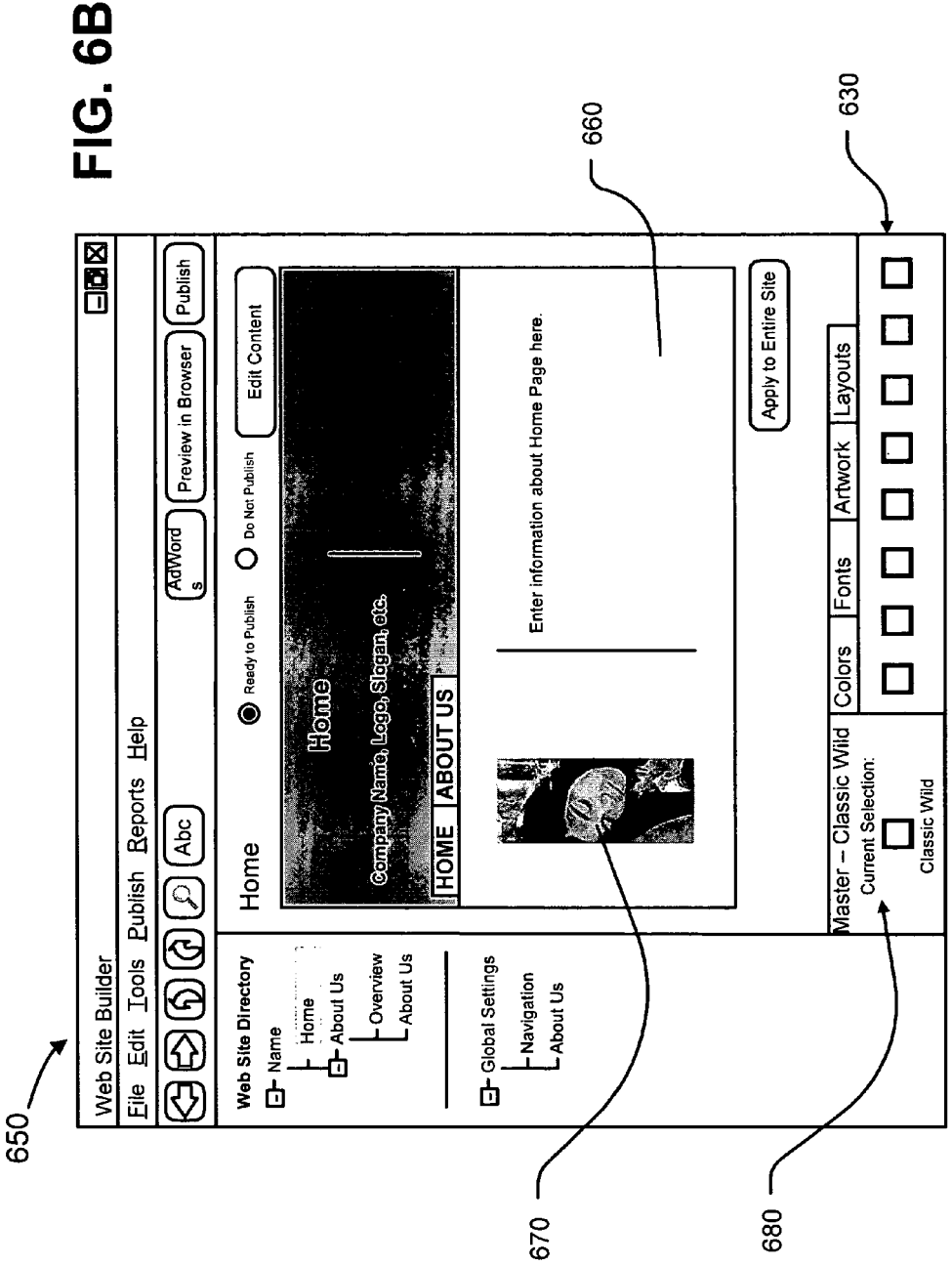

FIGS. 6A and 6B are exemplary diagrams of exemplary implementations of web pages that may include images optimized using a focal point. For exemplary purposes, image 460 and the focal point selected by focal point selector 465 of FIG. 4E may be used to generate the image on the exemplary web pages of FIGS. 6A and 6B. As shown in FIG. 4E, the focal point of image 460 may be the nose of the person located to the right in image 460. The image generated on the web page may depend upon the layout of the web page.

As shown in FIG. 6A, a first exemplary web site 600 may include a web page 610. Web page 610 may include a web page image 620 that may have been automatically adjusted using a focal point. Web site 600 may be displayed within web site builder 400 by selecting a "See Full Page" button 485, as shown in FIG. 4E. The display of web page 610 may be modified by selecting from an options menu 630. Options menu 630 may include a template option (e.g., "Master-Professional"), a colors option, a fonts option, an artwork option, and a layouts option. The template option may include a variety of web site templates from which a user may choose. For example, a type or style of template, such as a "Professional Hard" template 640, as shown in FIG. 6A, may be selected and web page 610 may be displayed in accordance with "Professional Hard" template 640. The colors, fonts, artwork, and layouts of web page 610 may be modified by selecting the colors option, fonts option, artwork option, and/or layouts option, respectively.

As further shown in FIG. 6A, web page image 620 may have a height that may be smaller than the height of selected (i.e., imported) image 460. Web page image 620 may have a width that may be larger than the width of imported image 460. Imported image 460 may be automatically adjusted to fit within web page 610. For example, the width of image 460 may be scaled and/or the height of image 460 may be cropped to fit within web page 610. Web page image 620 may include at least the focal point selected in image 460. For example, the nose of the person located to the right in image 460 may be displayed in web page image 620.

As shown in FIG. 6B, a second exemplary web site 650 may include a web page 660. Web page 660 may include a web page image 670 that may have been automatically adjusted using a focal point. Web site 650 may be displayed within web site builder 400 by selecting a "See Full Page" button 485, as shown in FIG. 4E. The display of web page 660 may be modified by selecting from an options menu 630, as discussed above for FIG. 6A. For example, a "Classic Wild" template 680, as shown in FIG. 6B, may be selected and web page 660 may be displayed in accordance with "Classic Wild" template 680.

As further shown in FIG. 6B, web page image 670 may have a height that may be larger than the height of imported image 460. Web page image 670 may have a width that may be smaller than the width of imported image 460. Imported image 460 may be automatically adjusted to fit within web page 660. For example, the width of image 460 may be cropped and/or the height of image 460 may be scaled to fit within web page 660. Web page image 670 may include at least the focal point selected in image 460. For example, the nose of the person located to the right in image 460 may be displayed in web page image 670.

Exemplary Processing

Figure 7:
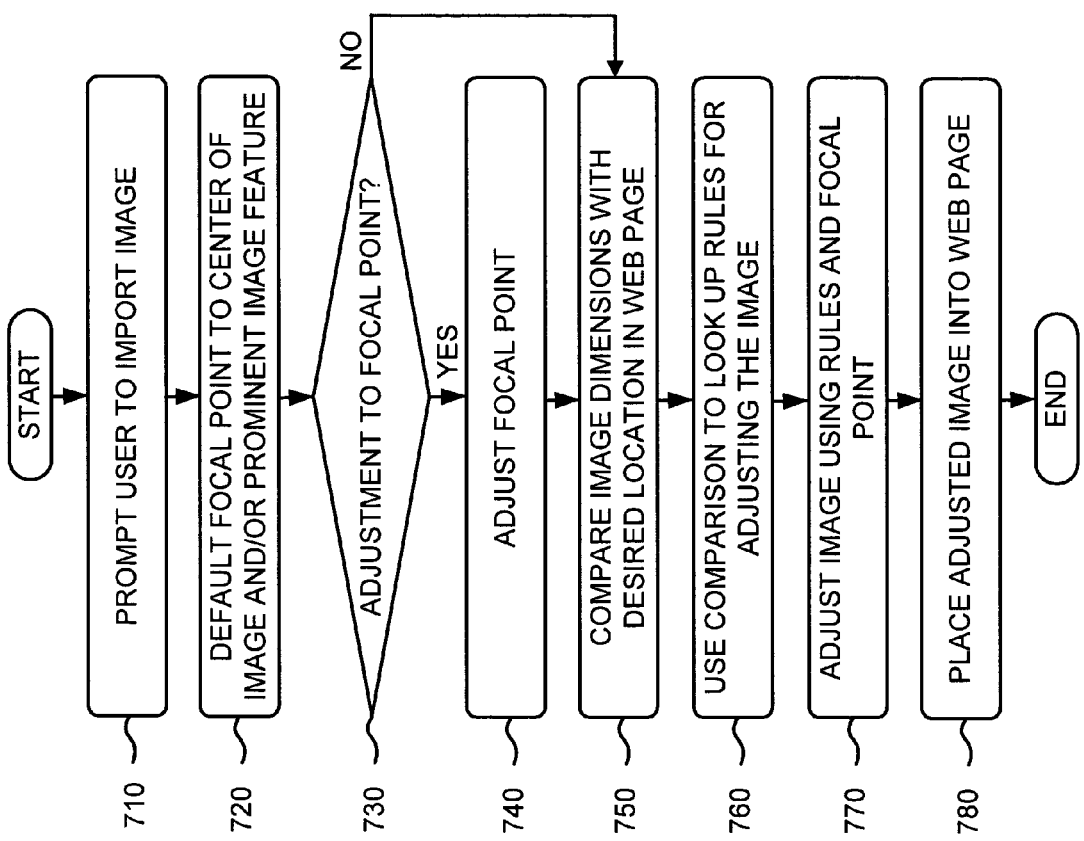
FIG. 7 is an exemplary flowchart of an exemplary implementation for inputting and/or optimizing web site images using a focal point.

FIG. 7 is an exemplary flowchart of an exemplary implementation for inputting and/or optimizing web site images using a focal point. FIG. 8 is an exemplary flowchart of an exemplary implementation for optimizing web site images using a focal point. In one implementation, the processing of FIGS. 7 and 8 may be performed by one or more software and/or hardware components within device 200. In another implementation, the processing may be performed by one or more software and/or hardware components within another device or a group of devices separate from or including device 200.

The processing of FIG. 7 may begin when a user is prompted to import an image that may be used as an image in a web site (block 710). For example, a user may select an image template in web site builder 400 and may be prompted to import an image for placement in a web page. In one implementation, a user may invoke image properties window 430, which may enable a user to select an image to place in picture section 415 of web page template 410 (as shown in FIG. 4B). In another implementation, a user may invoke image selection window 440, which may enable a user to select an image file (as shown in FIG. 4C).

The processing of FIG. 7 may default the focal point of the image to the center of the image and/or to a prominent feature of the image (block 720). For example, focal point selector 465 may default to the center of image 505, as shown in FIG. 5A. In one implementation, focal point selector 465 may provide its default location in a preview image 460 of preview section 455, as shown in FIG. 4C. In another implementation, focal point selector 465 may provide its default location in thumbnail 475 of the image, as shown in FIG. 4D. In still another implementation, focal point selector 465 may provide its default location in image 460 displayed within picture section 415 (FIG. 4B) of web page template 410, as shown in FIG. 4E.

In one implementation, the focal point of the image may be automatically selected using an image algorithm. For example, an image algorithm may be used to locate a face and/or primary objects within an image, and the focal point may be identified at these algorithm generated locations. In another implementation, object recognition may be applied to an image and may automatically specify a particular object as a default focal point or region. In other words, object recognition may determine what the focal point should be based on the content (e.g., the image). For example, object recognition may be used to determine the focal point on the center of a face (e.g., the nose), other objects (e.g., cars, trees, etc.), etc.

An image algorithm may be used with any type of image. For example, an image algorithm may be used with any type of digital image (e.g., binary (bilevel), grayscale, color, false-color, multi-spectral, thematic, etc.) provided in any type of format (e.g., a bitmap (BMP), a Graphics Interchange Format (GIF), Joint Photographic Experts Group (JPEG), Portable Network Graphics (PNG), Scalable Vector Graphics (SVG), one defined by vector objects, etc.).

A user may decide to adjust the focal point of the image (block 730—YES), and the focal point may be accordingly adjusted by the user (block 740). For example, in one implementation, a user may manipulate focal point selector 465, with a pointing device (e.g., a mouse), to select the focal point of the image in any of the images displayed in FIGS. 4C-4E. In another implementation, a user may select, with a pointing device, various points in the image and/or identify a region in the image using an area selection tool (e.g., a mouse).

A user may decide to accept the default focal point (block 730—NO). For example, a user may validate the automatically selected focal point. The processing of FIG. 7 may compare the dimensions of the imported image with the dimensions of the desired location of the image within the web page (block 750). For example, image width ($X_{IMAGE}$), image height ($Y_{IMAGE}$), template width ($X_{TEMPLATE}$), and template height ($Y_{TEMPLATE}$), as shown in FIG. 5A, may be used for such a comparison.

In one implementation, image width ($X_{IMAGE}$), image height ($Y_{IMAGE}$), template width ($X_{TEMPLATE}$), and template height ($Y_{TEMPLATE}$) (blocks 810 of FIG. 8) may be used to calculate an input image size (X,Y). For example, as shown in FIG. 8 (block 820), input image width (X) may be calculated from the following equation and may be represented as a percentage (%):

$$X = X_{IMAGE}/X_{TEMPLATE} \,(\%).$$

Input image height (Y) may be calculated from the following equation and may be represented as a percentage:

$$Y = Y_{IMAGE}/X_{IMAGE} \,(\%).$$

As further shown in FIG. 8 (block 830), an aspect ratio ($X_{TEMPLATE}/Y_{TEMPLATE}$) may be calculated by dividing template width ($X_{TEMPLATE}$) by template height ($Y_{TEMPLATE}$). For example, aspect ratio may have a variety of values, such as 1:1, 1:½, 1:2, 1:n, and/or n:1, where an "n" value may be undefined (e.g., 1:n may mean $X_{TEMPLATE}$ is specified, but $Y_{TEMPLATE}$ is not specified).

The processing of FIG. 7 may use the comparison of the dimensions of the imported image with the dimensions of the desired location of the image within the web page to look up rules for adjusting the image (block 760). For example, in one implementation an image sizing truth table, as shown in Table 1 and described below, may be used for adjusting the image. In another implementation, a variety of algorithms may be used for fitting the image within the web page, such as an algorithm to determine the best fit of the image within the web page.

The processing of FIG. 7 may adjust the image to fit within the web page using the rules and the focal point of the image. For example, in one implementation, the width and/or the height of the image may be cropped. The cropped dimension(s) may be determined by radially extending the cropped dimension(s) from the focal point, as discussed above for FIGS. 5B-5E.

The processing of FIG. 7 may place the adjusted image within the web page. For example, the image may be optimized for placement within the web page, e.g., the image may be automatically adjusted based on the rules and the selected focal point.

Turning again to FIG. 8, the processing involved in blocks 810-830 has been previously described. The processing of FIG. 8 may determine how the image may be automatically adjusted (i.e., may determine the outcome), based on input image width (X), input image height (Y), and aspect ratio ($X_{TEMPLATE}/Y_{TEMPLATE}$) (block 840). The outcome may be determined in a variety of ways. In one implementation, for example, the outcome may be determined by using an image sizing truth table. The image sizing truth table (Table 1) may take the following form.

TABLE 1

Image Sizing Truth Table

| Input Image Size | | Aspect Ratios | | | | |
|---|---|---|---|---|---|---|
| X | Y | 1:1 | 1:1/2 | 1:2 | 1:n | n:1 |
| 100% | 100% | DN | CY | SYCX | DN | DN |
| 100% | 75% | SYCX | CY | SYCX | DN | SY |
| 100% | 50% | SYCX | DN | SYCX | DN | SY |
| 100% | 25% | SYCX | SYCX | SYCX | DN | SY |
| 100% | 125% | CY | CY | SYCX | DN | SY |
| 100% | 150% | CY | CY | SYCX | DN | SY |
| 100% | 175% | CY | CY | SYCX | DN | SY |
| 75% | 100% | SXCY | SXCY | SYCX | SX | DN |
| 75% | 75% | SXY | SXCY | SYCX | SX | SY |
| 75% | 50% | SYCX | SXCY | SYCX | SX | SY |
| 75% | 25% | SYCX | SYCX | SYCX | SX | SY |
| 75% | 125% | SXCY | SXCY | SYCX | SX | SY |
| 75% | 150% | SXCY | SXCY | SXY | SX | SY |
| 75% | 175% | SXCY | SXCY | SXCY | SX | SY |
| 50% | 100% | SXCY | SXCY | SXY | SX | DN |
| 50% | 75% | SXCY | SXCY | SYCX | SX | SY |
| 50% | 50% | SXY | SXCY | SYCX | SX | SY |
| 50% | 25% | SYCX | SXY | SYCX | SX | SY |
| 50% | 125% | SXCY | SXCY | SXCY | SX | SY |
| 50% | 150% | SXCY | SXCY | SXCY | SX | SY |
| 50% | 175% | SXCY | SXCY | SXCY | SX | SY |
| 25% | 100% | SXCY | SXCY | SXCY | SX | DN |
| 25% | 75% | SXCY | SXCY | SXCY | SX | SY |
| 25% | 50% | SXCY | SXCY | SXY | SX | SY |
| 25% | 25% | SXY | SXCY | SYCX | SX | SY |
| 25% | 125% | SXCY | SXCY | SXCY | SX | SY |
| 25% | 150% | SXCY | SXCY | SXCY | SX | SY |
| 25% | 175% | SXCY | SXCY | SXCY | SX | SY |
| 125% | 100% | CX | SXCY | SYCX | SX | DN |
| 125% | 75% | SYCX | SXCY | SYCX | SX | SY |
| 125% | 50% | SYCX | CX | SYCX | SX | SY |
| 125% | 25% | SYCX | SYCX | SYCX | SX | SY |
| 125% | 125% | SXY | SXCY | SYCX | SX | SY |
| 125% | 150% | SXCY | SXCY | SYCX | SX | SY |
| 125% | 175% | SXCY | SXCY | SYCX | SX | SY |
| 150% | 100% | CX | SXCY | SYCX | SX | DN |
| 150% | 75% | SYCX | SXY | SYCX | SX | SY |
| 150% | 50% | SYCX | CX | SYCX | SX | SY |
| 150% | 25% | SYCX | SYCX | SYCX | SX | SY |
| 150% | 125% | SYCX | SXCY | SYCX | SX | SY |
| 150% | 150% | SXY | SXCY | SYCX | SX | SY |
| 150% | 175% | SXCY | SXCY | SYCX | SX | SY |
| 175% | 100% | CX | SXCY | SYCX | SX | DN |
| 175% | 75% | SYCX | SYCX | SYCX | SX | SY |
| 175% | 50% | SYCX | CX | SYCX | SX | SY |
| 175% | 25% | SYCX | SYCX | SYCX | SX | SY |
| 175% | 125% | SYCX | SXCY | SYCX | SX | SY |
| 175% | 150% | SYCX | SXCY | SYCX | SX | SY |
| 175% | 175% | SXY | SXCY | SYCX | SX | SY |

A variety of outcomes (blocks 850) may be provided by the image sizing truth table. For example, in a first implementation (i.e., "do nothing" (DN)), the dimensions of the image may not be adjusted. In a second implementation (CX), image width ($X_{IMAGE}$) may be cropped based on the selected focal point. In a third implementation (CY), image height ($Y_{IMAGE}$) may be cropped based on the selected focal point. In a fourth implementation (SXCY), image width ($X_{IMAGE}$) may be scaled to fit within the width of the web page (e.g., the image template) and image height ($Y_{IMAGE}$) may be cropped based on the selected focal point.

In a fifth implementation (SYCX), image height ($Y_{IMAGE}$) may be scaled to fit within the height of the web page and image width ($X_{IMAGE}$) may be cropped based on the selected focal point. In a sixth implementation (SXY), both image width ($X_{IMAGE}$) and image height ($Y_{IMAGE}$) may be scaled to fit within the width and the height of the web page. In a seventh implementation (SX), image width ($X_{IMAGE}$) may be scaled to fit within the width of the web page. In an eighth implementation (SY), image height ($Y_{IMAGE}$) may be scaled to fit within the height of the web page.

In one implementation consistent with the principles of the invention, a maximum image upscaling threshold may be set. For example, a maximum image upscaling threshold may be set to a percentage value (e.g., 133%, 150%, etc.). This may help prevent skewing of an image that has a dimension much smaller than the comparable dimension in the image template.

In another implementation, an image enhancement algorithm may be used on low resolution images that are scaled up. If such an algorithm is used, then the maximum image upscaling threshold may be relaxed (e.g., not used and/or set to a higher percentage value).

In still another implementation, images may be scaled proportionally. For example, if an image is scaled to fit its height, then the image width may be scaled the same amount. In still another implementation, a "do not crop" option may be provided. For example, such an option may be implemented by replacing the CX entries (crop image width ($X_{IMAGE}$)) and the CY entries (crop image height ($Y_{IMAGE}$)) in the image truth table with a SXY entry (scale image width ($X_{IMAGE}$) and image height ($Y_{IMAGE}$)).

Although an exemplary truth table has been described, a truth table may be just one way in which a decision about whether to crop and/or scale an image might be made. There may be a variety of ways in which a determination of which dimension may be scaled, which dimensions may be cropped, and/or what limits may be placed on such scaling and cropping. For example, an algorithm may be used to determine scaling, cropping, and/or limits to place on scaling and cropping.

Although the focal point has been used to adjust the dimensions of an image, as described above, the focal point may also be used with other image transformations. Exemplary image transformations may include blurring, shaping, grayscale, color adjusting, noise removal, beveling, background drop (e.g., make background transparent), etc. For example, an image transformation algorithm may be used to alter (e.g., blur) a portion of an image at some distance from the focal point. In one implementation, a background color and neighboring objects may be examined to determine which transformation to apply. For example, if the image is being placed in an area having a blue background color, then a colorization may be applied to the edge of the image so that the image may blend in with the background for a smoother transition. This information may also be used to determine what the best sizing of the image may be for a specific placement of the image. For example, if the image has a blue vertical region at the vertical location to be cropped, then it may be determined that the image may be better sized if the blue vertical region remained in the cropped image.

CONCLUSION

Systems and methods consistent with the principles of the invention may enable images to be automatically adjusted for placement within a web page based on the selected focal point of the image. Such an arrangement may eliminate the time consuming and frustrating task of manually adjusting (e.g., cropping, scaling) the image to fit within a web page.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7 and 8, the order of the acts may be modified in other implementations consistent with the principles of the invention. Further, non-dependent acts may be performed in parallel.

Also, exemplary user interfaces have been described with respect to FIGS. 1, 4A-4E, 6A and 6B. In other implementations consistent with the principles of the invention, the user interfaces may include more, fewer, or different pieces of information.

Furthermore, the concept of a focal point may be applied to other forms of electronic media items, such as, e.g., audio streams and electronic text. For example, a focal point may be applied to an audio stream and may be used to filter the audio stream to the most important information (e.g., a particular voice, a portion of a speech, etc.). A focal point or focal "instance" (e.g., a particular paragraph, a chapter, a section of a document, etc.) may be applied to a variety of electronic text (e.g., email, a web page, an online book, a paragraph, etc.) to highlight the focal instance in the electronic text.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by one or more processors, a digital image;
    providing, by one or more processors, a document template, where the document template includes a region in which a portion of the received digital image is to be provided;
    receiving, by one or more processors, a selection from a user of a focal point of the received digital image;
    adjusting, by one or more processors, the received digital image, based on the selection of the focal point of the received digital image, to form an adjusted image, where adjusting the received digital image includes:
        determining first dimensions associated with the received digital image, the first dimensions including an image height and an image width,
        determining second dimensions and an aspect ratio associated with the region,
        comparing the first dimensions with the second dimensions,
        determining one or more rules for adjusting the received digital image based on the comparison,
        adjusting the received digital image based on the first dimensions, the second dimensions, the aspect ratio, and the determined one or more rules,
        where the adjusted digital image includes the focal point of the received digital image;
    positioning, by one or more processors, the adjusted digital image within the region of the document template to form a preview document;
    providing, by one or more processors, the preview document to the user;
    receiving, by one or more processors, an input from the user to edit the adjusted digital image to form an edited digital image; and
    positioning, by one or more processors, the edited digital image within the region of the document template.

2. The method of claim 1, where the focal point comprises a shape.

3. The method of claim 2, where the shape of the focal point identifies an area of the received digital image.

4. The method of claim 1, where the focal point of the received digital image corresponds to a particular feature of the received digital image.

5. The method of claim 1, where the one or more rules comprise at least one of:
    maintaining the first dimensions;
    cropping the image width of the received digital image;
    cropping the image height of the received digital image;
    scaling the image width of the received digital image to fit within a region width of the region and cropping the image height of the received digital image;
    scaling the image height of the received digital image to fit within a region height of the region and cropping the image width of the received digital image;
    scaling the image width and the image height of the received digital image to fit within the region width and the region height of the region;
    scaling the image width of the received digital image to fit within the region width of the region; or
    scaling the image height of the received digital image to fit within the region height of the region.

6. A method, comprising:
    receiving, by one or more processors, an image;
    providing, by one or more processors, a document template, where the document template includes an image template in which a portion of the received image is to be provided;
    receiving, by one or more processors, a selection, from a user, of a focal point of the received image;
    comparing, by one or more processors, first dimensions associated with the received image with second dimensions associated with the image template, the first dimensions including an image height and an image width;
    adjusting, by one or more processors, the received image, based on the received selection of the focal point of the received image, an aspect ratio associated with the image template, and the comparing of the first dimensions and the second dimensions, to form an adjusted image corresponding to the second dimensions, where the adjusted image includes the focal point of the received image,
    the adjusting the received image further including:
        determining one or more rules for adjusting the received image based on the aspect ratio and based on the comparing of the first dimensions of the received image with the second dimensions of the image template; and
        adjusting the received image based on the one or more rules;
    positioning, by one or more processors, the adjusted image within the image template to form a preview document;

providing, by one or more processors, the preview document to the user;
receiving, by one or more processors, an input from the user to edit the adjusted image to form an edited image; and
positioning, by one or more processors, the edited image within the image template of the document template.

7. The method of claim 6, where the focal point corresponds to a particular feature of the received image.

8. A non-transitory memory device comprising:
instructions which, when executed by at least one processor, cause the at least one processor to receive an image;
instructions which, when executed by the at least one processor, cause the at least one processor to provide a document template, where the document template includes a region in which a portion of the received image is to be provided, where the region is associated with particular dimensions;
instructions which, when executed by the at least one processor, cause the at least one processor to receive a selection, by a user, of a focal point of the received image;
instructions which, when executed by the at least one processor, cause the at least one processor to compare image dimensions of the received image with the particular dimensions, the image dimensions including an image height and an image width;
instructions which, when executed by the at least one processor, cause the at least one processor to determine one or more rules to adjust the received image based on an aspect ratio associated with the region and based on the comparison of the image dimensions with the particular dimensions;
instructions which, when executed by the at least one processor, cause the at least one processor to adjust the received image, based on the selection of the focal point of the received image, the aspect ratio associated with the region, the one or more rules, and the comparing of the image dimensions with the particular dimensions, to form an adjusted image that corresponds to the particular dimensions, where the adjusted image includes the focal point of the received image;
instructions which, when executed by the at least one processor, cause the at least one processor to position the adjusted image within the region of the document template to form a preview document;
instructions which, when executed by the at least one processor, cause the at least one processor to provide the preview document to the user;
instructions which, when executed by the at least one processor, cause the at least one processor to receive an input from the user to edit the adjusted image to form an edited image; and
instructions which, when executed by the at least one processor, cause the at least one processor to position the edited image within the region of the document template to form a document.

9. The memory device of claim 8, where dimensions of the adjusted image correspond to the particular dimensions.

10. The memory device of claim 8, where the focal point corresponds to a particular feature of the received image.

11. The memory device of claim 8, where the instructions to receive the selection of the focal point of the received image include:
instructions to enable a thumbnail of the received image to be provided within the region; and
instructions to receive the selection of the focal point of the received image via the thumbnail.

12. The memory device of claim 8, where the instructions to receive the selection of the focal point of the received image include:
instructions to provide a preview image of the received image within the particular dimensions; and
instructions to receive the selection of the focal point of the received image via the preview image.

13. The method of claim 6, where the preview document comprises:
a web page.

14. A system, comprising:
a memory to store an image; and
one or more processors to:
provide the image to a user;
present a document template, where the document template includes an image template in which a portion of the image is to be provided;
receive a selection, by the user, of a focal point of the image;
compare first dimensions, associated with the image, with second dimensions, associated with the image template, the first dimensions including an image height and an image width;
determine rules for adjusting the image based on an aspect ratio associated with the image template and the comparing of the first dimensions of the image with the second dimensions of the image template;
enlarge or reduce the image, based on the selection of the focal point of the image, the comparing of the first dimensions and the second dimensions, the determined rules, and the aspect ratio associated with the image template, to form an adjusted image that corresponds to the second dimensions, where the adjusted image includes the focal point of the image; and
insert the adjusted image within the image template.

15. A device, comprising:
a memory to store instructions; and
a processor to execute the instructions to:
receive an image having an image height and an image width,
provide a document template, where the document template includes a region in which a portion of the received image is to be provided, where the region is associated with particular dimensions,
receive a selection of a focal point of the received image,
determine rules for adjusting the received image based on comparing the image height and the image width with the particular dimensions;
adjust, based on the focal point of the received image, the image height of the received image, and the image width of the received image, the determined rules, and an aspect ratio associated with the region, the received image to form an adjusted image that corresponds to the particular dimensions, where the adjusted image includes the focal point of the received image,
position the adjusted digital image within the region of the document template to form a preview document,
provide the preview document,
receive, in response to providing the preview document, an input to edit the adjusted image to form an edited image,
position the edited image within the region of the document template to form a document, and
provide the document.

16. The method of claim 6, where receiving the image comprises receiving a plurality of images of a video or animation sequence;
- where receiving the selection of the focal point includes receiving a selection of respective focal points of at least a first image and a last image included in the plurality of images of the video or animation sequence; and
- where adjusting the received image includes adjusting at least the first image and the last image of the video or animation sequence based on the selected respective focal points.

17. The method of claim 6, where receiving the image comprises receiving an electronic media item that includes the image.

18. The method of claim 6, further comprising:
- receiving a selection of the image template from a plurality of image templates included in the document template.

19. The system of claim 14, where the focal point corresponds to a particular feature of the image.

20. The device of claim 15, where the processor is further to:
- automatically select a particular feature of the received image as the focal point.

* * * * *

UNITED STATES PATENT AND TRADEMARK OFFICE
CERTIFICATE OF CORRECTION

| | | |
|---|---|---|
| PATENT NO. | : 8,577,166 B1 | Page 1 of 1 |
| APPLICATION NO. | : 11/394346 | |
| DATED | : November 5, 2013 | |
| INVENTOR(S) | : David Ferguson et al. | |

It is certified that error appears in the above-identified patent and that said Letters Patent is hereby corrected as shown below:

In the Claims

Claim 15 (Column 20, Line 59) should read as follows:

position the adjusted image within the region of

Signed and Sealed this
Eighteenth Day of March, 2014

Michelle K. Lee
*Deputy Director of the United States Patent and Trademark Office*